(12) United States Patent
Mejia et al.

(10) Patent No.: US 12,423,371 B2
(45) Date of Patent: Sep. 23, 2025

(54) UTILIZING MACHINE LEARNING MODELS TO PROCESS LOW-RESULTS WEB QUERIES AND GENERATE WEB ITEM DEFICIENCY PREDICTIONS AND CORRESPONDING USER INTERFACES

(71) Applicant: Adobe Inc., San Jose, CA (US)

(72) Inventors: Irgelkha Mejia, Austin, TX (US); Michele Saad, Austin, TX (US); Eunyee Koh, San Jose, CA (US); Andrew Thomson, Moraga, CA (US); Lauren Dest, Austin, TX (US); Dustin Ground, Austin, TX (US); Anna Hammond, Austin, TX (US); Arjun Athreya, Austin, TX (US); Catherine Chiodo, Austin, TX (US)

(73) Assignee: Adobe Inc., San Jose, CA (US)

( * ) Notice: Subject to any disclaimer, the term of this patent is extended or adjusted under 35 U.S.C. 154(b) by 177 days.

(21) Appl. No.: 17/661,641

(22) Filed: May 2, 2022

(65) Prior Publication Data
US 2023/0350968 A1 Nov. 2, 2023

(51) Int. Cl.
*G06F 16/957* (2019.01)
*G06F 16/9536* (2019.01)
*G06F 16/958* (2019.01)

(52) U.S. Cl.
CPC ...... *G06F 16/9577* (2019.01); *G06F 16/9536* (2019.01); *G06F 16/958* (2019.01)

(58) Field of Classification Search
CPC . G06F 16/9577; G06F 16/958; G06F 16/9536
(Continued)

(56) References Cited

U.S. PATENT DOCUMENTS 7,840,538 B2 * 11/2010 Joshi ............... G06F 16/332
707/672
7,937,340 B2 * 5/2011 Hurst-Hiller ....... G06F 16/9535
706/14

(Continued)

OTHER PUBLICATIONS

Google Trends; "Explore what the world is searching"; Date downloaded May 11, 2022; https://trends.google.com/trends/?geo=US.

(Continued)

*Primary Examiner* — Tony Mahmoudi
*Assistant Examiner* — Michael Le
(74) *Attorney, Agent, or Firm* — Keller Preece PLLC

(57) ABSTRACT

Methods, systems, and non-transitory computer readable media are disclosed for utilizing machine learning models to extract digital signals from low-results web queries and generate item demand deficiency predictions for digital item lists corresponding to websites. In one or more embodiments, the deficiency identification system identifies a low-results query submitted by client devices navigating a website. The deficiency identification system generates features for the low-results query and the digital item list to generate a deficiency prediction relative to demand indicated by the low-results query. In some embodiments, the deficiency identification system utilizes a deficiency prediction model to process the extracted signals and generate a deficiency confidence score corresponding to the low-results query. Based on the deficiency confidence score, the deficiency identification systemd can generate and provide demand notifications via one or more graphical user interfaces.

20 Claims, 17 Drawing Sheets

(58) Field of Classification Search
USPC .......................................................... 707/713
See application file for complete search history.

(56) References Cited

U.S. PATENT DOCUMENTS

| | | | | |
|---|---|---|---|---|
| 8,645,369 | B2* | 2/2014 | Poblete | G06F 16/353 |
| | | | | 707/728 |
| 8,868,471 | B1* | 10/2014 | Hullender | G06Q 10/101 |
| | | | | 706/23 |
| 11,392,651 | B1* | 7/2022 | McClusky | G06F 40/295 |
| 11,423,453 | B1* | 8/2022 | Harris | G06F 16/953 |
| 2003/0202009 | A1* | 10/2003 | Kasriel | G06F 16/9577 |
| | | | | 707/E17.121 |
| 2005/0114319 | A1* | 5/2005 | Brent | G06F 16/3322 |
| 2005/0125390 | A1* | 6/2005 | Hurst-Hiller | G06F 7/00 |
| 2005/0165809 | A1* | 7/2005 | Leymann | G06Q 10/10 |
| 2005/0177558 | A1* | 8/2005 | Dixon | G06F 16/2452 |
| 2007/0016545 | A1* | 1/2007 | Broder | G06F 16/28 |
| 2008/0249786 | A1* | 10/2008 | Oldham | G06F 16/951 |
| | | | | 707/999.005 |
| 2009/0282000 | A1* | 11/2009 | Bennett | G06F 16/9535 |
| 2009/0282022 | A1* | 11/2009 | Bennett | G06F 16/957 |
| | | | | 707/999.005 |
| 2010/0076949 | A1* | 3/2010 | Zoeter | G06F 16/334 |
| | | | | 707/706 |
| 2010/0287129 | A1* | 11/2010 | Tsioutsiouliklis | G06F 16/951 |
| | | | | 706/46 |
| 2013/0080423 | A1* | 3/2013 | Parikh | G06F 16/242 |
| | | | | 707/E17.014 |
| 2014/0317078 | A1* | 10/2014 | Gallagher | G06F 16/24578 |
| | | | | 707/723 |
| 2015/0088689 | A1* | 3/2015 | de Castro Leao Monteiro | |
| | | | | G06Q 30/0617 |
| | | | | 705/26.62 |
| 2015/0169644 | A1* | 6/2015 | Gong | G06F 16/532 |
| | | | | 707/769 |
| 2016/0092772 | A1* | 3/2016 | Srivastava | G06N 20/00 |
| | | | | 706/12 |
| 2016/0188708 | A1* | 6/2016 | Glover | G06F 16/9535 |
| | | | | 707/722 |
| 2017/0154304 | A1* | 6/2017 | Aryeetey | G06F 21/602 |
| 2018/0004752 | A1* | 1/2018 | Deng | G06F 16/3347 |
| 2018/0246899 | A1* | 8/2018 | Natchu | G06F 16/93 |
| 2019/0129998 | A1* | 5/2019 | Kataria | G06Q 10/1053 |
| 2019/0266257 | A1* | 8/2019 | Natchu | G06F 16/137 |
| 2020/0012983 | A1* | 1/2020 | Wicker | G06Q 10/06315 |
| 2020/0013000 | A1* | 1/2020 | Wicker | H04L 67/1001 |
| 2020/0192943 | A1* | 6/2020 | Fox | G06N 3/08 |
| 2021/0073224 | A1* | 3/2021 | Zhao | G06F 16/2282 |
| 2021/0073225 | A1* | 3/2021 | Nelson | G06F 16/24537 |
| 2021/0133224 | A1* | 5/2021 | Tiwari | G06F 16/319 |
| 2021/0142263 | A1* | 5/2021 | Thakkar | G06F 16/2329 |
| 2021/0201345 | A1* | 7/2021 | De Ridder | G06Q 30/0244 |
| 2021/0303609 | A1* | 9/2021 | Atasu | G06V 10/761 |
| 2021/0357955 | A1* | 11/2021 | Rishi | G06F 16/957 |
| 2022/0058433 | A1* | 2/2022 | Han | G06F 40/30 |
| 2022/0076164 | A1* | 3/2022 | Conort | G06N 20/00 |
| 2022/0138231 | A1* | 5/2022 | Misiewicz | G06F 16/248 |
| | | | | 707/722 |
| 2022/0138258 | A1* | 5/2022 | Misiewicz | G06F 16/906 |
| | | | | 707/737 |
| 2022/0238103 | A1* | 7/2022 | Madhusudhan | G10L 15/1815 |
| 2023/0139831 | A1* | 5/2023 | Wang | G06V 30/1444 |
| | | | | 704/9 |
| 2023/0206675 | A1* | 6/2023 | Wang | G06F 40/40 |
| | | | | 704/9 |

OTHER PUBLICATIONS

Golbandi, Nadav et al. "Expediting search trend detection via prediction of query counts"; WSDM 2013: Proceedings of the sixth ACM international conference on Web search and data mining; Feb. 2013.

Guzman, Jheser et al.; "On-line Relevant Anomaly Detection in the Twitter Stream: An Efficient Bursty Keyword Detection Model"; ODD 2013: Proceedings of the ACM SIGKDD Workshop on Outlier Detection and Description; Aug. 2013; pp. 31-39.

* cited by examiner

Fig. 8E

| Popularity | Vendor | Vendor Standing | Margin | Avg. Delivery Time |
|---|---|---|---|---|
| A | Vendor 1 | High | 3.2% | 6.2 days |
| A | Vendor 2 | High | 3.01% | 6.1 days |
| B | Vend | Medium | 2.89% | 5.9 days |
| B | Vendor 4 | Medium | 3.15% | 7.8 days |
| B | Vendor 5 | High | 2.12% | 6.6 days |
| C | Vendor 6 | Low | 1.89% | 8.2 days |
| C | Vendor 7 | Medium | 1.76% | 8.9 days |
| C | Vendor 8 | Low | 2.06% | 7.3 days |
| C | Vendor 9 | Low | 2.44% | 9.4 days |

Fig. 8F

UTILIZING MACHINE LEARNING MODELS TO PROCESS LOW-RESULTS WEB QUERIES AND GENERATE WEB ITEM DEFICIENCY PREDICTIONS AND CORRESPONDING USER INTERFACES

BACKGROUND

Recent years have seen significant improvements in hardware and software platforms for monitoring digital interactions between computing devices across computer networks. For example, some conventional systems analyze digital interactions across websites and utilize machine learning models to predict digital content to transmit to various client devices. Thus, conventional systems utilize a variety of computer-implemented algorithms to generate digital query responses and identify digital content to provide across computer networks.

Although conventional systems can intelligently respond to digital queries and provide digital content to client devices, such systems have a number of drawbacks with regard to accuracy, efficiency, and flexibility. For example, conventional systems are often unable to accurately identify digital items that are not already present or available within a particular database or digital list. To illustrate, when a client device conducts a digital search via a website, conventional systems often query an existing digital list or database of content items corresponding to the website. However, when such a digital list is missing an item corresponding to the query, conventional systems often fail to generate query responses that include pertinent digital content.

Similarly, conventional systems are also inefficient in that they waste computing resources. For example, when a digital list or database corresponding to a website lacks pertinent items for a particular query, conventional systems repeatedly provide zero-response or low-response query responses to digital queries. This not only wastes computing resources in providing irrelevant (or low-relevance) responses, it also wastes resources in requiring requesting client devices to navigate to additional web resources to identify pertinent information. Accordingly, conventional systems waste memory and processing power at server devices in providing low-relevance responses and waste client device resources in excessive navigating through responses, websites, and user interfaces to obtain pertinent digital information.

Conventional systems are also inflexible. Indeed, as just mentioned, conventional systems that monitor client device interactions at websites rigidly look to static digital lists that indicate items for populating query responses. However, this rigid approach exacerbates the inaccuracies and inefficiencies discussed above because digital lists or databases often fail to reflect all digital content pertinent to (or sought from) a particular website. Accordingly, conventional systems undermine flexibility in providing digital content to client devices navigating websites utilizing computer networks.

In addition, conventional systems are also inefficient for website administrator devices. Indeed, in order to analyze or address the foregoing problems, conventional systems require website administrators to navigate through multiple inefficient user interfaces. For example, conventional systems provide different user interfaces indicating queries over time, additional user interface indicating query responses, additional user interfaces indicating digital item lists for generating query responses, and additional user interfaces indicating changes in website traffic or trends. Accordingly, conventional systems require significant user interfaces, user interactions, and corresponding computer resources to monitor website traffic and corresponding digital item lists.

SUMMARY

One or more embodiments and/or solve one or more problems in the art with systems, methods, and non-transitory computer readable storage media that utilize machine learning models to extract digital signals from low-results web queries and generate item deficiency predictions (relative to demand reflected in the low-results web queries) for digital item lists corresponding to websites. For example, the disclosed systems monitor interactions with client devices at one or more websites to identify rates of low-response queries. The disclosed systems extract digital signals from low-response queries that appear above a threshold rate. For example, the disclosed systems utilize an embedding machine learning model to generate query feature vectors for the low-results queries and determine feature distances relative to the low-results queries and digital item lists within a feature embedding space. Moreover, the disclosed systems utilize a computer-implemented named entity model to extract named entities from the low-results queries. In addition, the disclosed systems utilize a time series model to extract time series features. In one or more embodiments, the disclosed systems utilize a deficiency prediction model to process these digital signals and generate deficiency scores. Moreover, the disclosed systems can generate and provide deficiency notifications based on the deficiency scores through a variety of efficient user interfaces. Accordingly, the disclosed systems can remedy deficiencies in digital item lists utilized to respond to website queries to improve the accuracy, efficiency, and flexibility of corresponding computing devices.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

FIGS. 8C-8F illustrate a series of graphical user interfaces for displaying item deficiency data in accordance with one or more embodiments of the present disclosure.

DETAILED DESCRIPTION

Figure 1:
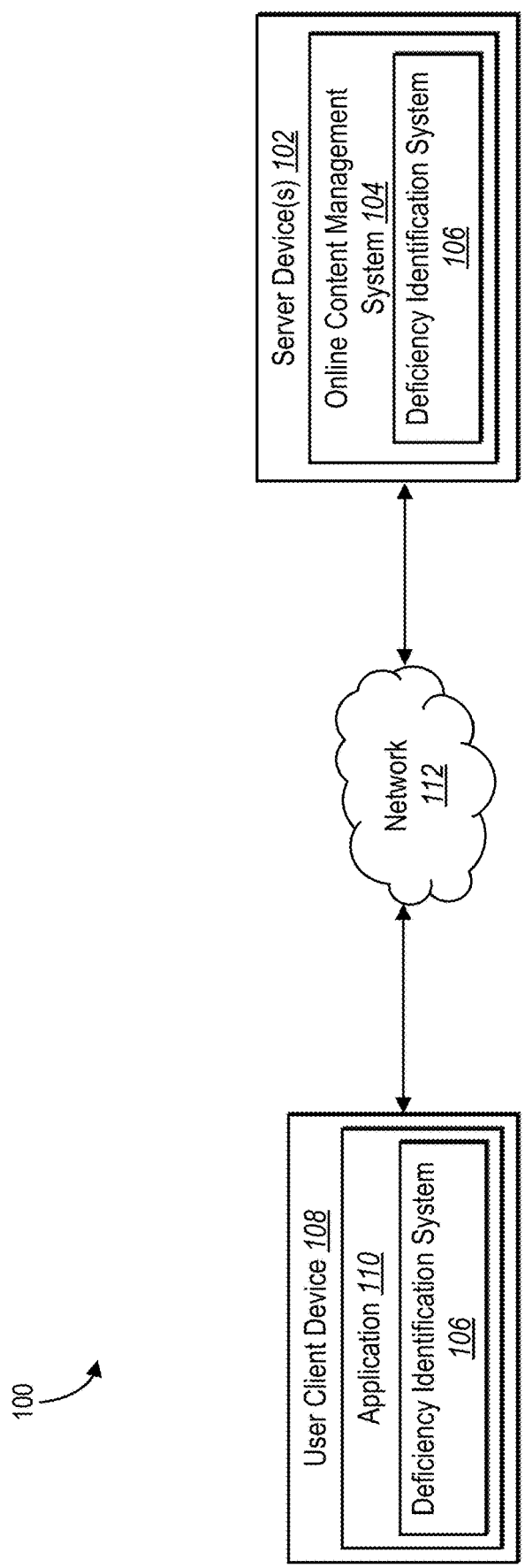
FIG. 1 illustrates an environment in which a deficiency identification system operates in accordance with one or more embodiments of the present disclosure.

One or more embodiments of the present disclosure include a deficiency identification system that utilizes machine learning models to extract digital signals from low-results website queries to generate item deficiency predictions and corresponding user interfaces. For example, the deficiency identification system identifies low-results queries by monitoring queries and responses to the queries for various client devices accessing a website. In some embodiments, the deficiency identification system intelligently generates features based on a digital item list or catalog corresponding to the website relative to one or more low-results queries. In one example, the deficiency identification system utilizes an embedding machine learning model to extract item context feature vectors from content items for a website digital item list. The deficiency identification system also utilizes the embedding machine learning model to generate a query feature vector from a low-results query. The deficiency identification system compares distances within an embedding feature space between the item feature vectors and the query feature factors. In addition, in one or more embodiments, the deficiency identification system utilizes an entity matching model to extract named entities from a low-results query and utilizes a time series model to generate or classify time series features for the low-results query. Moreover, in some implementations, the deficiency identification system uses a deficiency prediction model to analyze the extracted features and generate a deficiency confidence score indicating a deficiency (e.g., unmet client device need or demand) for an item not already on the website digital item list. In some implementations, the deficiency identification system generates and provides a deficiency notification via a user interface to efficiently remedy deficiencies in a website digital item list.

As mentioned above, in some implementations, the deficiency identification system identifies a low-results query. For example, the deficiency identification system identifies digital queries submitted to a website that generate few, if any, results. In some embodiments, the deficiency identification system identifies low-results queries by comparing a number of results associated with a query with a low-results threshold. Additionally, in some implementations, the deficiency identification system evaluates low-results queries that are frequently provided by client devices. For instance, the deficiency identification system can compare the number of client devices providing the low-results query with a client device threshold (e.g., a threshold query rate).

In some embodiments, the deficiency identification system generates a query feature vector for a low-results query and a set of item feature vectors from the digital item list. In particular, the deficiency identification system utilizes an embedding machine learning model trained to map digital content to an embedding space, where distances within the embedding space reflect feature similarity (e.g., semantic similarity). Accordingly, the deficiency identification system generates a set of item feature vectors that summarize content within the digital item list and a query feature vector that reflect content of the low-results query. In some embodiments, the deficiency identification system determines a feature distance between the query feature vector and the set of item feature vectors within the embedding space.

Additionally, in some implementations, the deficiency identification system extracts additional features from the low-results query. For instance, the deficiency identification system generates a time series feature. In particular, the deficiency identification system utilizes a time series model that generates time series features. In one or more embodiments, the time series model is a classification model (such as a convolutional neural network) that analyzes a sequence of requests and generates a time series feature classification (e.g., sporadic, seasonal, recurrent). In other embodiments, the deficiency identification system generates a different time series feature (e.g., a vector embedding reflecting timing that can be further processed by additional models).

As mentioned above, in some embodiments, the deficiency identification system utilizes an entity matching model to extract or identify named entities from a low-results query. For example, the entity matching model can include a linguistic grammar-based technique, statistical model, and/or machine learning model that locates and classifies named entities (e.g., names, geopolitical entities, locations, organizations, or facilities). Thus, in some implementations the deficiency identification system utilizes the entity matching model to extract these named entities from one or more low-results queries.

As mentioned, the deficiency identification system utilizes a deficiency prediction model to process extracted features to generate a deficiency score. Indeed, in some embodiments, the deficiency prediction model processes the query feature vector and the set of item feature vectors to generate a deficiency confidence score. Indeed, in some embodiments, the deficiency identification system utilizes feature distance within an embedding space, the time series features, and/or the named entities as input into the deficiency prediction model (e.g., a machine learning model such as a convolutional neural network). The deficiency prediction model generates a deficiency confidence score indicating an item deficiency with regard to a digital item list corresponding to the website.

In some embodiments, the deficiency identification system provides a deficiency notification for display via a user interface at a user client device based on the deficiency confidence score. For example, the deficiency identification system generates a notification that indicates that a digital item list is missing an item corresponding to the low-results query. The deficiency notification may include a prompt to view additional data relating to the low-results query. For instance, the deficiency identification system may identify one or more item sources from which the user can obtain the deficient item and provide the one or more item sources for display.

As suggested above, in one or more embodiments the deficiency identification system improves accuracy, efficiency, and flexibility relative to conventional systems. For example, over time, the deficiency identification system accurately expands digital item lists corresponding to websites by dynamically analyzing signals from low-results queries corresponding to the website. Thus, the deficiency identification system actively monitors low-results queries, utilizes machine learning models to extract and analyze digital signals from the low-results queries, and generates a deficiency prediction score corresponding to the low-results query. Based on the deficiency prediction score, the deficiency identification system can accurately and actively identify and suggest other items to add to digital item lists that correspond to the demand indicated by the low-results query. Thus, over time the deficiency identification system identifies pertinent items responsive to items identified from low-results website queries and improves the accuracy of query responses.

In addition, in one or more implementations the deficiency identification system also improves efficiency relative to conventional systems. In particular, the deficiency identification system generates deficiency prediction scores from low-results queries to identify deficiencies in digital item lists corresponding to a website. Thus, overtime, the deficiency identification system intelligently modifies digital item lists to provide pertinent information in response to desired items identified in low-results queries. This results in fewer wasted server resources in repeatedly generating low-relevance query responses. Moreover, this approach reduces wasted computing resources for client devices that can efficiently identify pertinent information at a single website and corresponding user interface (rather than repeatedly navigating to various websites and conducting duplicative searches through various user interfaces). Furthermore, the deficiency identification system determines item deficiencies relative to demand with low latency relative to the actual events/queries that indicate the corresponding trend.

In one or more implementations, the deficiency identification system also improves flexibility. Indeed, in contrast to the rigid approach utilized by conventional systems, in one or more implementations the deficiency identification system actively and intelligently identifies items to add to digital item lists to flexibly modify website resources over time. Moreover, the deficiency identification system flexibly distinguishes between low-results queries that reflect unmet demand (and a need to expand a digital item list) and low-results queries that are a result of other factors (e.g., spelling mistakes). In addition, the deficiency identification system jointly models query trends together with item availability to discovery deficiencies/opportunities for the website. Thus, the deficiency identification system flexibly modifies the underlying items available to respond to website queries based on intelligently identified demand, rather than rigidly treating databases and digital item lists as static resources for generating query responses.

Furthermore, the deficiency identification system also improves efficiency by providing efficient user interfaces for website administration devices. Indeed, the deficiency identification system can analyze deficiency scores and generate deficiency notifications and corresponding user interfaces. This allows website administrators to efficiently identify deficiencies in digital item lists relative to query intent and demand corresponding to client devices visiting the website. Thus, via a single user interface (and with limited user interactions), the deficiency identification system allows website administration devices to identify and remedy deficiencies in a digital item list corresponding to a website.

As illustrated by the foregoing discussion, the present disclosure utilizes a variety of terms to describe features and advantages of the disclosed method. Additional detail is now provided regarding the meaning of such terms. As used herein, the term "digital query" refers to a digital request for information. In particular, a digital query refers to a request for information regarding one or more items or objects (e.g., one or more items in a digital item list). In some embodiments, a digital query is provided by a client device associated with a site visitor via a website. A digital query can comprise a text entry into a search box of a website. For example, a digital query may comprise terms indicating items (e.g., "digital image editing software," "no-touch faucet," or "lemur coloring book") that may or may not be an online catalog. A digital query can also include a voice query or an image query.

As used herein, the term "digital response" refers to a reply or response to a digital query. In particular, a digital response includes results provided to a client device in response to a digital query submitted by the client device. A digital response can include one or more items from a digital item list that are associated with a digital query. For example, a digital response to the digital query "digital image editing software" can comprise no results or a plurality of results. If the digital response includes results, the results may comprise items (e.g., software packages) from the digital item list that are related to the digital query.

As used herein, the term "website" refers to one or more web pages (e.g., corresponding to a domain name). In particular, a website comprises one or more web pages corresponding to a searchable digital item list. For example, a website may include a web platform with a searchable catalog of items.

As used herein, the term "digital item list" refers to a database, repository, array, spreadsheet, matrix, or list of objects, items, or products. In particular, a digital item list includes a collection of items corresponding to a website. For example, a digital item list may comprise a digital catalog of items that a system stocks, sells, or distributes via a website.

As used herein, the term "low-results query" refers to a query associated with few or no results (e.g., results below a threshold number). In particular, a low-results query comprises a query of a digital item list, wherein the query is associated with a digital response comprising few or zero results. For example, a low-results query might include the name of an item or object that is not listed within a digital item list. To illustrate, a "low-results query" may comprise the text "lemur coloring book" that returns either no results or a number of results below a threshold number.

As used herein, the term "item feature vector" refers to a vector that represents an item. In particular, item feature vectors includes a vectors representing the items of a digital item list. For example, an item feature vector may comprise a natural language embedding generated based on the text of an item within a digital item list. Relatedly, the term "set of item feature vectors" can refer to a collection of item feature vectors for a digital item list.

As used herein, the term "query feature vector" refers to a vector that represent a digital query. In particular, a query feature vector comprises a vector representing the content of a digital query. For example, a query feature vector may comprise a natural language embedding of the text of a digital query.

As used herein, the term "deficiency notification" refers to a notification, alert, or publication indicating an item deficiency. In particular, a deficiency notification comprises a user interface notification that indicates that a digital item list is missing a particular item. The deficiency notification can also indicate that the deficient item is also in demand (e.g., sought after or requested by a threshold level of client devices as indicated by low-response queries).

As used herein, the term "item deficiency" refers to a shortcoming corresponding to or lack of an item. In particular, an item deficiency refers to the lack of an item within a digital item list. In some implementations, an item deficiency indicates both a lack of an item as well as a demand for the item by site visitors. For example, the deficiency identification system might determine an item deficiency of an item (e.g., a digital image editing software package) within a digital item list (e.g., a set of other software packages).

As used herein, the term "deficiency prediction model" refers to a machine learning model trained to predict a deficiency (e.g., a deficiency confidence score). In particular, a deficiency prediction model comprises a machine learning model trained to predict the deficiency of items within a digital item list (e.g., relative to a demand for the items). A machine learning model refers to a computer-implemented model that is tuned or trained based on inputs to generate predictions, classifications, or approximate unknown functions. In particular, the term machine-learning model can include a neural network that includes interconnected neurons arranged in layers that communicate and learn to approximate complex functions and generate outputs based on a plurality of inputs provided to the model. The term machine-learning model includes deep convolutional neural networks ("CNNs"), fully convolutional neural networks ("FCNs"), or recurrent neural networks ("RNNs") such as long short-term memory neural networks ("LSTMs"). Additionally or alternatively, the term machine-learning model includes a random forest model, a series of gradient boosted decision trees (e.g., XGBoost algorithm), a multilayer perceptron, a linear regression, a support vector machine, a deep tabular learning architecture, a deep learning transformer (e.g., self-attention-based-tabular transformer), or a logistic regression. In other words, a neural network is an algorithm that implements deep learning techniques or machine learning that utilizes a set of algorithms to attempt to model high-level abstractions in data. Thus, a deficiency prediction model can comprise a convolutional neural network, a recurrent neural network, a long short-term memory model, or other type of machine learning model that generates a deficiency confidence score for an item.

As used herein, the term "deficiency confidence score" refers to a numerical value that represents a likelihood of a deficiency (e.g., a likelihood or confidence that a deficiency exists). In particular, a deficiency confidence score indicates the likelihood that a digital item list is deficient (e.g., is deficient with regard to an item is in demand as reflected by low-results queries). For example, a deficiency confidence score comprises a number between 0 and 1, where values closer to 1 indicate that a digital item list does not include an item that is in demand as indicated by a low-result query.

The following disclosure provides additional detail regarding the deficiency identification system in relation to illustrative figures portraying example embodiments and implementations of the deficiency identification system. For example, FIG. 1 illustrates a schematic diagram of a system environment (or "environment") 100 in which a deficiency identification system 106 operates in accordance with one or more embodiments. As illustrated, the environment 100 includes one or more server device(s) 102, connected to a user client device 108 via a network 112. While FIG. 1 shows an embodiment of the deficiency identification system 106, alternative embodiments and configurations are possible.

As shown in FIG. 1, the server device(s) 102 and the user client device 108 are connected via the network 112. As shown, in one or more implementations, each of the components of the environment 100 communicate via the network 112. The network 112 comprises a suitable network over which computing devices are able to communicate. Example networks are discussed in additional detail below in relation to FIG. 11.

As shown, the environment 100 includes the server device(s) 102. The server device(s) 102 generates, stores, receives, and/or transmits digital information including a digital item list, a website, queries, responses, etc. In particular, in one or more implementations, the server device(s) 102 provides digital information via web pages or native application to devices such as the user client device 108. The server device(s) 102 is able to communicate with the user client device 108 via the network 112. For example, the server device(s) 102 gathers and/or receives digital information including digital queries or digital lists from the user client device 108. The server device(s) 102 may also send responses and deficiency notifications to the user client device 108. In some embodiments, the server device(s) 102 comprise a distributed server where the server device(s) 102 include a number of server devices distributed across the network 112 and located in different physical locations. The server device(s) 102 optionally comprises a content server, an application server, a communication server, a web-hosting server, or an online content management server.

As further shown in FIG. 1, the server device(s) 102 includes online content management system 104. In one or more embodiments, the online content management system 104 comprises a system that facilitates the online distribution or sale of products via the network 112 (e.g., a content distribution system or e-commerce management system). The online content management system 104 also performs various backend functions in order to facilitate the online distribution of products. In some embodiments, the online content management system 104 conducts searches of digital item lists to identify items matching a query. Furthermore, the online content management system 104 optionally performs other backend functions associated with a website or content/product distribution. For example, the online content management system 104 generates web pages or other types of network content that are provided to the user client device 108 for the purpose of finding and selecting items for distribution, purchase, rental, download, lease, or other consumption.

As illustrated in FIG. 1, the environment 100 includes the user client device 108. The user client device 108 may generate, store, receive, and send digital data. For example, the user client device 108 communicates with the server device(s) 102 via the network 112. The user client device 108 illustrated in FIG. 1 may comprise various types of client devices. For example, in some embodiments, the user client device 108 is a mobile device such as a laptop, tablet, mobile telephone, smartphone, etc. In other embodiments, the user client device 108 includes non-mobile devices, such as desktops, or other types of client devices. Additional details regarding the computing devices, of which the user client device 108 is one implementation, are discussed below with respect to FIG. 11.

The user client device 108 is optionally associated with a user or user account of a platform managed by the online content management system 104. For instance, the user client device 108 is associated with a site visitor or a user who is browsing and viewing products listed by the online content management system 104. For instance, the user client device 108 may be associated with a site visitor searching for an item within a digital list of items. As mentioned, the user client device 108 communicates with the server device(s) 102. The user client device 108 uploads and sends digital data including digital queries to the server device(s) 102 via the network 112. Additionally, the user client device 108 displays digital responses to a user associated with the user client device 108.

Additionally, or alternatively, the user client device 108 (or another client device) is associated with an administrator of a website. For example, the user client device 108 (e.g., an administrator client device) sends, to the server device(s) 102 information regarding items listed as part of a digital list of items. In some embodiments, the user client device 108 (e.g., an administrator client devices) sends, to the server device(s) 102, digital data for items in digital lists of items. The server device(s) 102 may send to the user client device 108 a deficiency notification indicating an item deficiency in a digital item list.

As illustrated in FIG. 1, the user client device 108 includes the application 110. The application 110 may be a web application or a native application on the user client device 108 (e.g., a mobile application, a desktop application, etc.). The application 110 interfaces with the deficiency identification system 106 to provide digital content including digital responses, deficiency notifications, and graphical user interfaces to the device(s) 102. In one or more implementations, the application 110 is a browser that renders a graphical user interface on the display of the user client device 108. For example, the application 110 renders graphical user interfaces for receiving user customizations.

FIG. 1 depicts the deficiency identification system 106 located on the server device(s) 102 and on the user client device 108. The deficiency identification system 106 may be implemented by (e.g., located entirely or in part) on one or more other components of the environment 100. For example, the deficiency identification system 106 may be entirely located on the server device(s) 102. In another example, the user client device 108 implements the deficiency identification system 106. For instance, the deficiency identification system 106 located on the user client device 108 (e.g., a visitor client device or an administrator client device) may generate a set of item feature vectors, generate a deficiency notification, and one or more acts as part of identifying an item deficiency.

Although the environment 100 includes a single user client device 108, in one or more embodiments, the environment 100 includes multiple user client devices and client devices. For example, the environment 100 include a plurality of visitor devices and a plurality of administrator devices.

Additionally, the user client device 108 optionally communicates directly with the deficiency identification system 106, bypassing the network 112. Moreover, the deficiency identification system 106 may access one or more databases housed on the server device(s) 102 or elsewhere in the environment 100.

As mentioned, in certain cases, the user client device 108 and the server device(s) 102 work together to implement the deficiency identification system 106. For example, in some embodiments, the server device(s) 102 train one or more machine learning models discussed herein and provide the one or more machine learning models to the user client device 108 for implementation (e.g., to generate deficiency confidence scores and identify deficiencies at the user client device 108). In some embodiments, the server device(s) 104 train one or more machine learning models, the client device 108 request information regarding a deficiency, the server(s) 104 generate a deficiency confidence score and/or deficiency notification utilizing the one or more machine learning models and provide information regarding the deficiency to the user client device 108. Furthermore, in some implementations, the user client device 108 assists in training one or more machine learning models.

While FIG. 1 illustrates an example environment in which the deficiency identification system 106 operates, the following figures and corresponding discussion provide additional detail regarding how the deficiency identification system 106 generates deficiency confidence scores and/or provides deficiency notifications in accordance with one or more embodiments. In particular, FIG. 2 and the corresponding paragraphs provide an overview of the deficiency identification system 106 providing a deficiency notification in accordance with one or more embodiments. In particular, FIG. 2 illustrates a series of acts 200 including an act 202 of identifying a low-results query, an act 204 of extracting features from the low-results query and a digital item list, an act 206 of generating a deficiency confidence score, and an act 208 of providing a deficiency notification.

Figure 2:
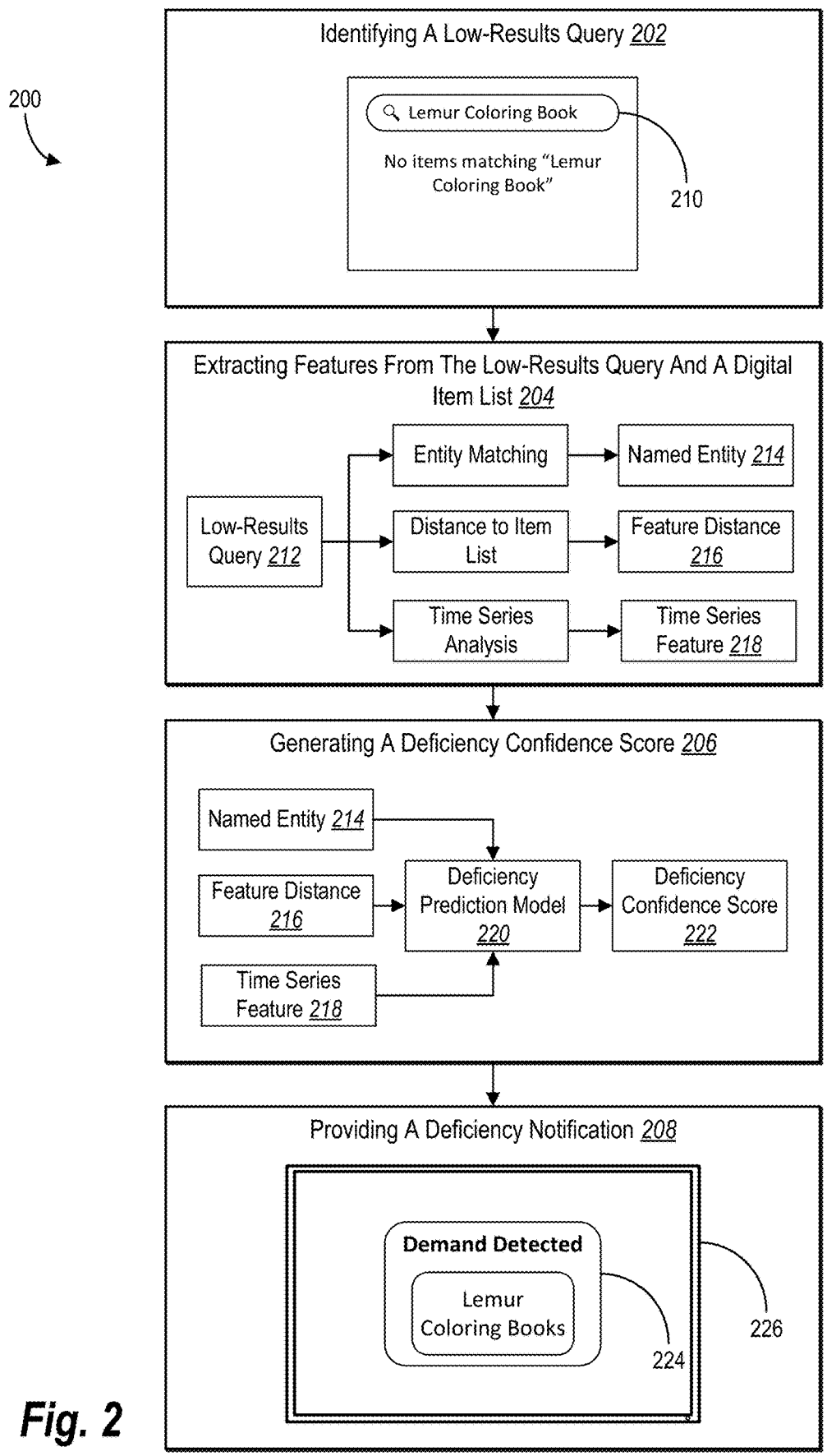
FIG. 2 illustrates an overview diagram of providing a deficiency notification in accordance with one or more embodiments of the present disclosure.
Figure 3:
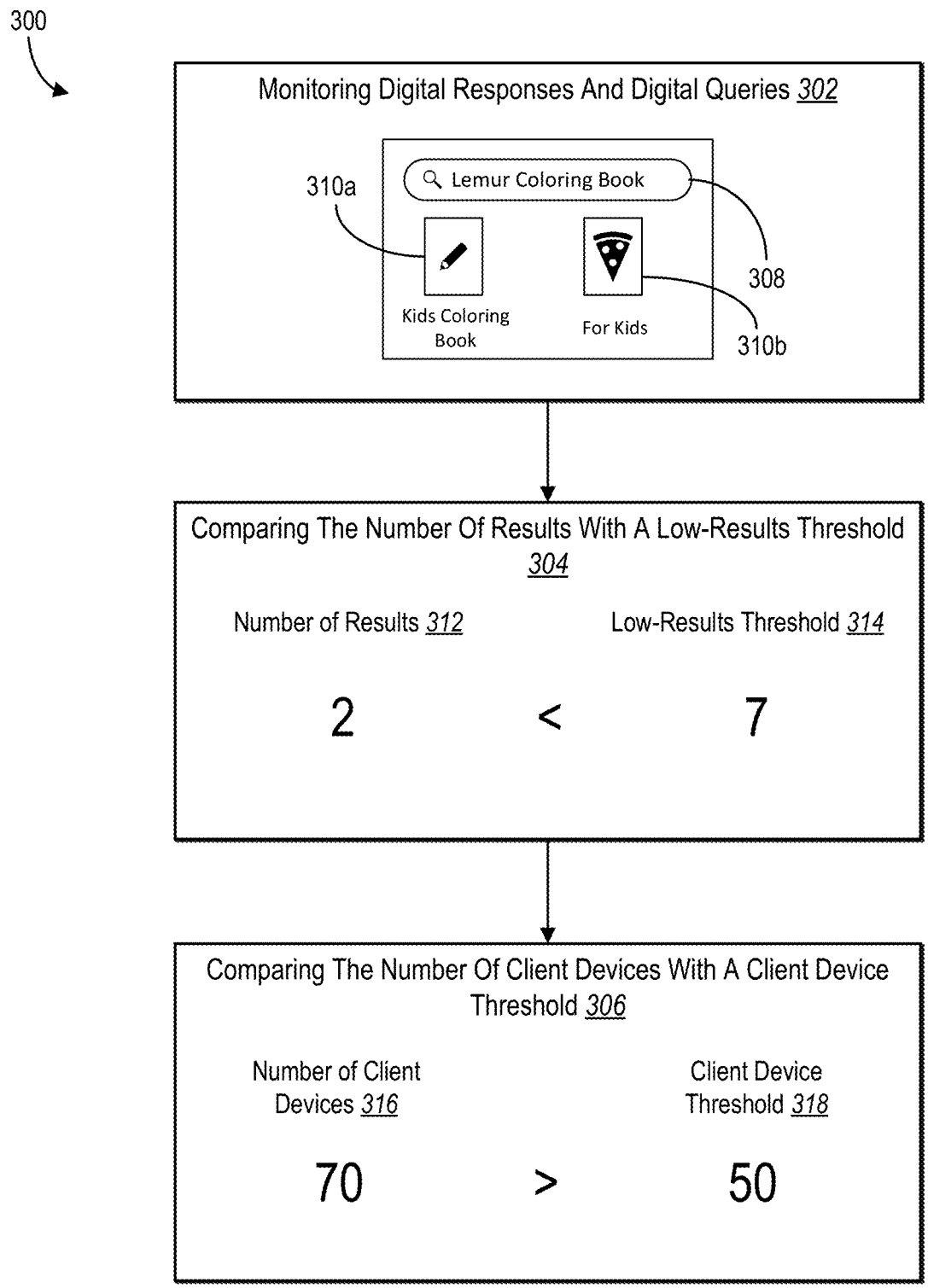
FIG. 3 illustrates an overview diagram of identifying a low-results query in accordance with one or more embodiments of the present disclosure.

As illustrated in FIG. 2, the series of acts 200 includes the act 202 of identifying a low-results query. The deficiency identification system 106 monitors a plurality of digital queries and digital responses via a website corresponding to a digital item list to identify a low-results query. For example, the deficiency identification system 106 can monitor digital queries and corresponding digital responses of an e-commerce website. Generally, low-results queries include digital queries received from one or more client devices that correspond with zero or few results. For example, and as illustrated in FIG. 2, the deficiency identification system 106 determines that a digital query 210 "Lemur coloring book" is a low-results query because the digital query 210 included a digital response without any results. The deficiency identification system 106 may monitor digital queries from one or more unique client devices. As mentioned, low-results queries may be associated with a number of results below a low-results threshold. FIG. 3 and the corresponding discussion further detail the deficiency identification system 106 utilizing various threshold values to identify low-results queries.

Upon identifying low-results queries, the deficiency identification system can perform additional acts to determine whether the low-results queries indicate unmet demand (e.g., a true deficiency in a digital item list) or stem from other factors (e.g., spelling errors). In particular, the deficiency identification system can determine digital item list context (e.g., catalog context) and determine the deficiency by comparing the low-result queries with the digital item list context. As shown in FIG. 2, the deficiency identification system 106 performs the act 204 of extracting features from the low-results query and a digital item list. In particular, the deficiency identification system 106 extracts features from a low-results query 212 that inform a deficiency prediction model. In some embodiments, the deficiency identification system 106 relies on features from three processing blocks or machine learning models—entity matching, distance to item list, and time series analysis—to generate a named entity 214, a feature distance 216, and a time series feature 218, respectively.

Figure 4:
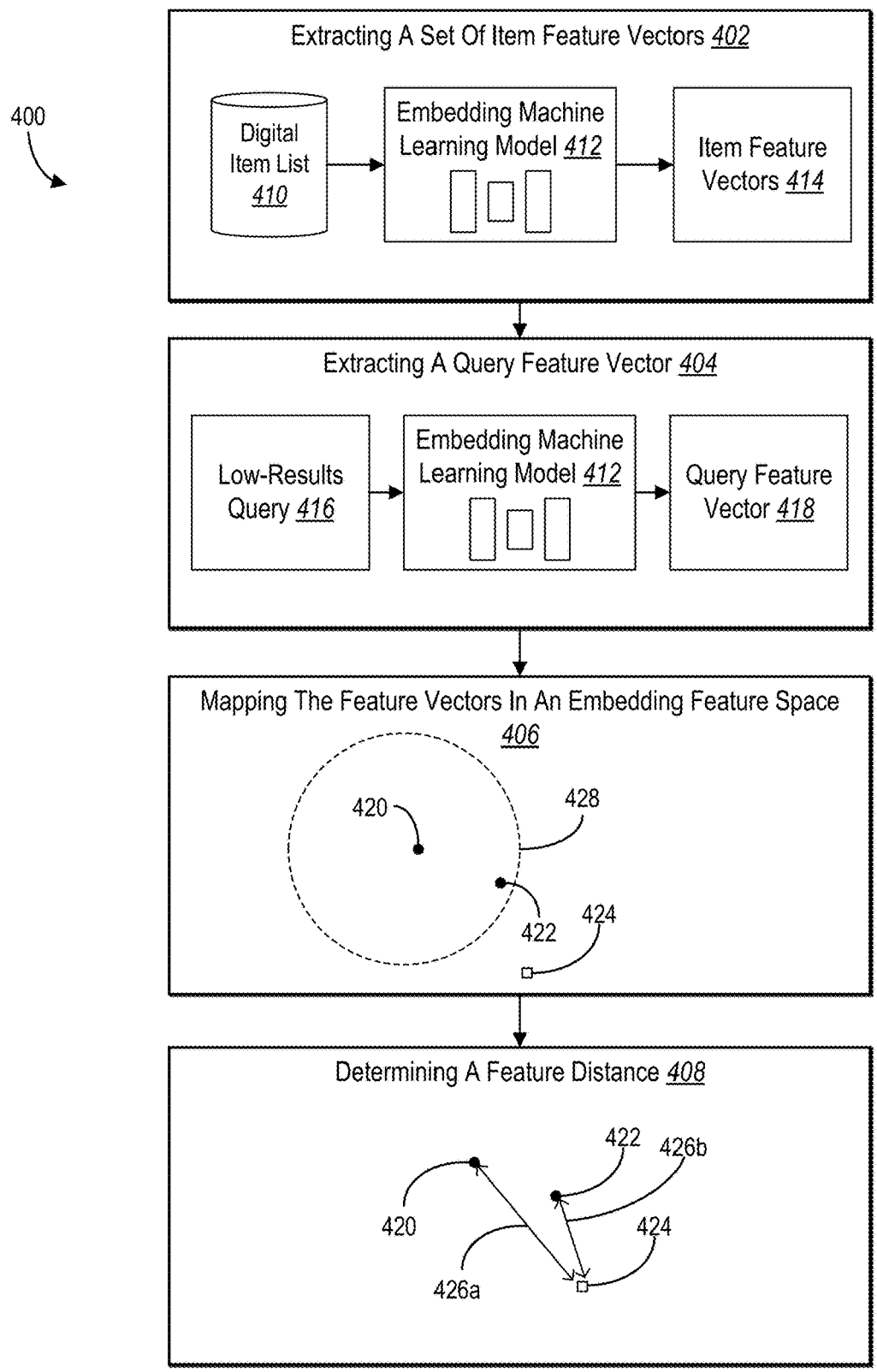
FIG. 4 illustrates determining a feature distance for a query feature vector in accordance with one or more embodiments of the present disclosure.
Figure 5:
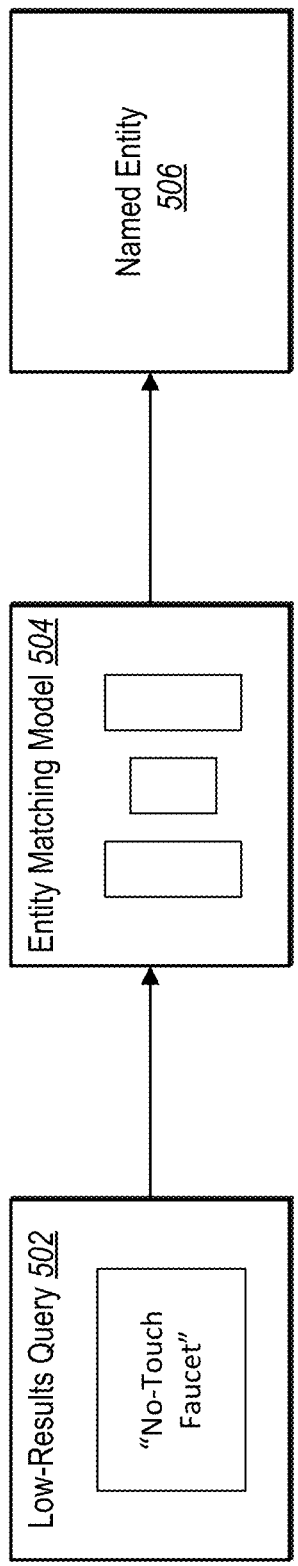
FIG. 5 illustrates utilizing an entity matching model to extract a named entity in accordance with one or more embodiments of the present disclosure.
Figure 6:
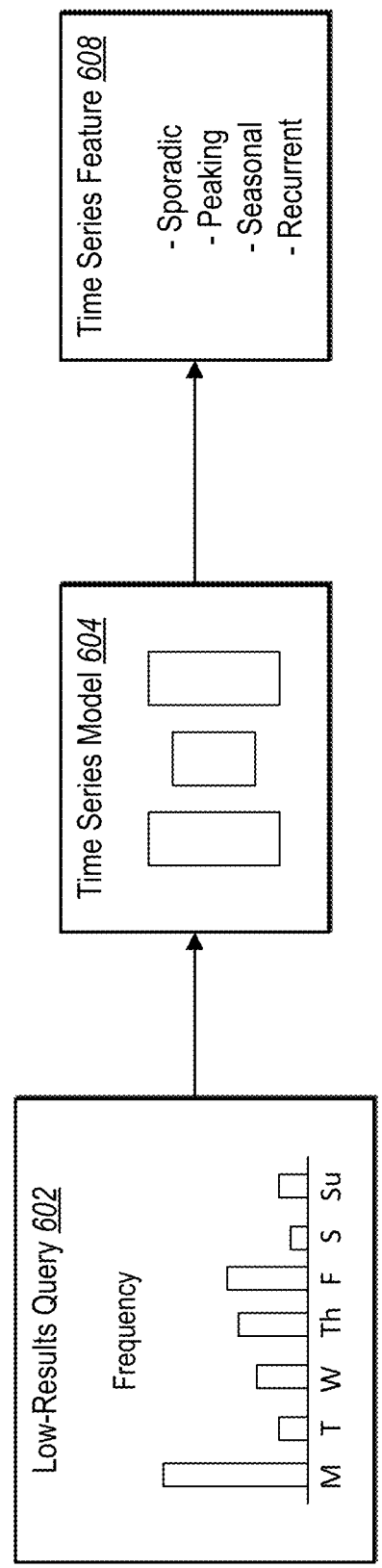
FIG. 6 illustrates utilizing a time series model to generate a time series feature in accordance with one or more embodiments of the present disclosure.

The deficiency identification system 106 utilizes an entity matching model to determine whether the low-results query 212 includes a named entity. FIG. 5 illustrates the deficiency identification system 106 extracting the named entity 214 in accordance with one or more embodiments. The deficiency identification system 106 also determines the feature distance 216 that indicates relevance of the low-results query 212 to the digital item list. FIG. 4 and the corresponding discussion provide additional detail regarding the deficiency identification system 106 determining the feature distance 216 in accordance with one or more embodiments. FIG. 6 and the corresponding paragraphs further detail how the deficiency identification system 106 generates a time series feature 218 indicating the periodicity of the low-results query 212 in accordance with one or more embodiments.

Figure 7A:
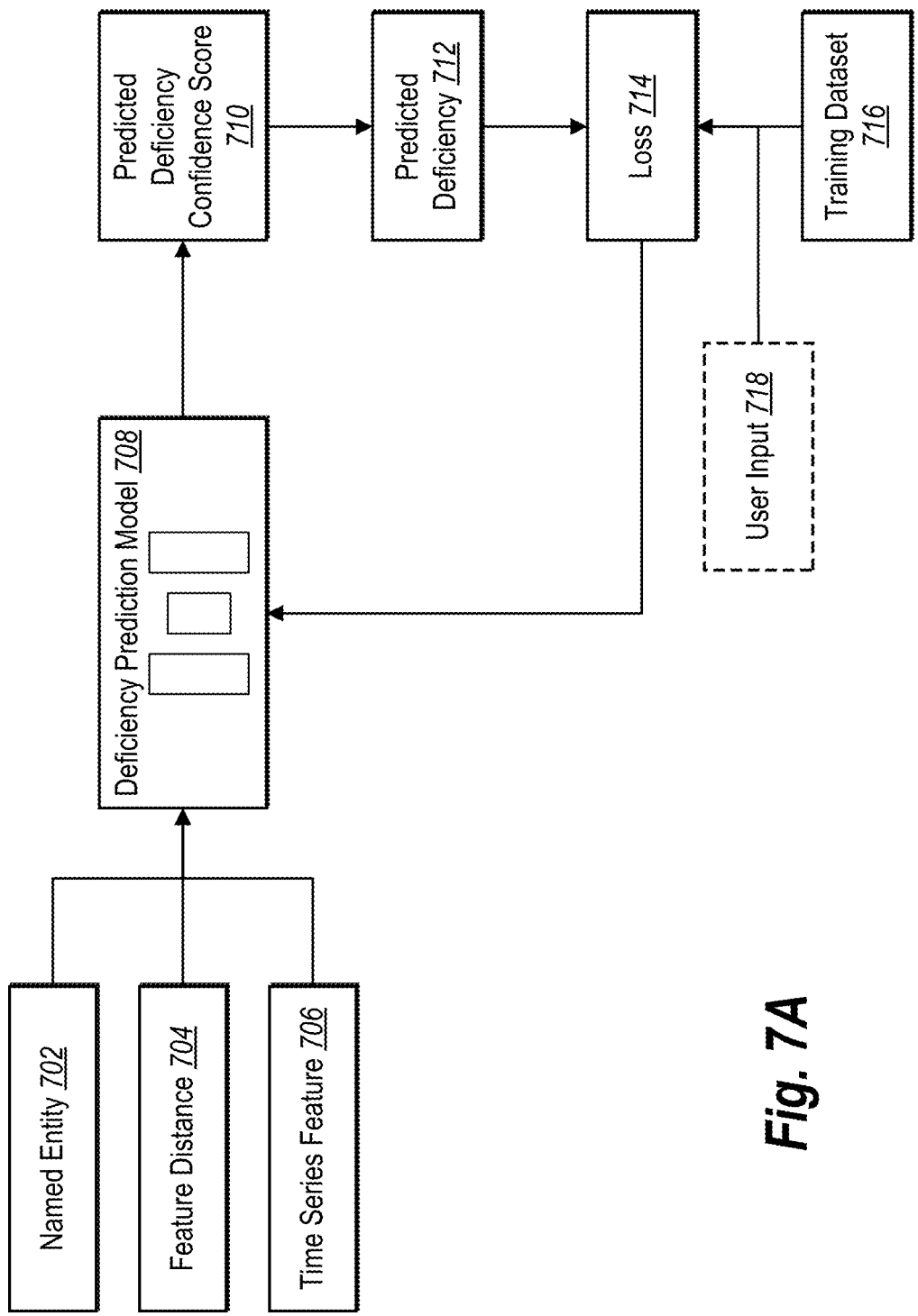
FIGS. 7A-7B illustrate learning parameters for and utilizing a deficiency prediction model in accordance with one or more embodiments of the present disclosure.
Figure 7B:
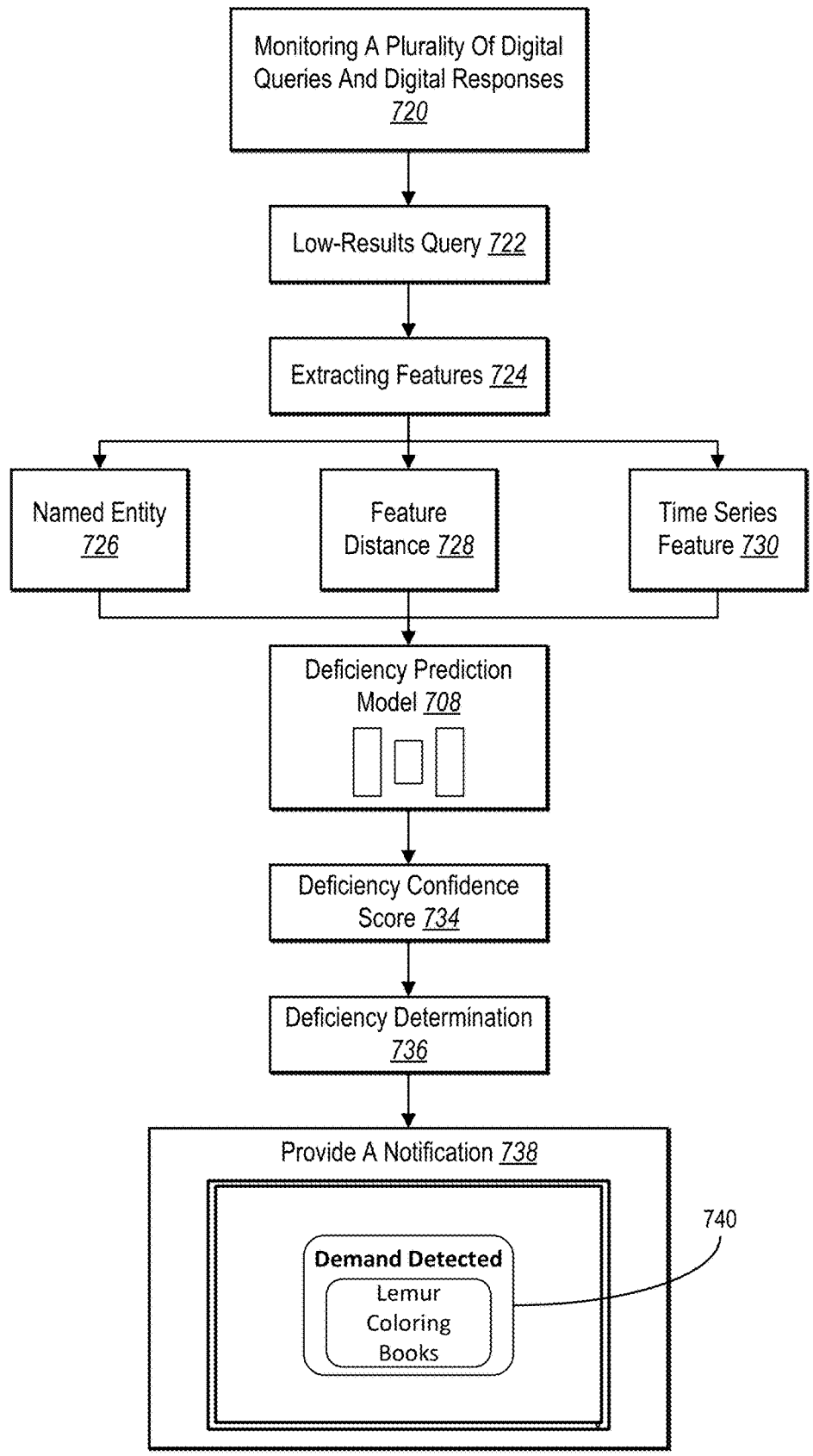

As illustrated in FIG. 2, the series of acts 200 includes the act 206 of generating a confidence score. In particular, the deficiency identification system 106 utilizes a deficiency prediction model 220 to analyze the extracted features to generate a deficiency confidence score 222. As illustrated, the deficiency identification system 106 utilizes the named entity 214, the feature distance 216, and the time series feature 218 as input into the deficiency prediction model 220. The deficiency prediction model 220 generates the deficiency confidence score 222 that indicates an item deficiency corresponding to the low-results query 212. For example, the deficiency confidence score 222 indicates a likelihood that there is a deficiency of lemur coloring books in the digital item list. FIGS. 7A-7B illustrate the deficiency identification system 106 modifying parameters of and applying a deficiency prediction model in accordance with one or more embodiments.

FIG. 2 further illustrates the act 208 of providing a deficiency notification. In particular, the deficiency identification system 106 provides a deficiency notification 224 for display via a graphical user interface at a user client device 226 (e.g., an administrator client device). In some embodiments, the deficiency identification system 106 makes a deficiency determination based on the deficiency confidence score 222. Based on identifying an item deficiency, the deficiency identification system 106 provides the deficiency notification 224 for display. In some embodiments, the deficiency identification system 106 provides additional information within the deficiency notification 224 or in response to user selection of a detail element within the deficiency notification 224. FIGS. 8A-8F illustrate a series of graphical user interfaces including a deficiency notification and additional deficiency data in accordance with one or more embodiments.

As mentioned previously, in one or more implementations the deficiency identification system 106 identifies a low-results query based on monitoring a plurality of digital queries and digital responses. For instance, the deficiency identification system 106 analyzes digital queries and corresponding digital responses to identify low-results queries. FIG. 3 illustrates an overview of the deficiency identification system 106 identifying a low-results query in accordance with one or more embodiments. Specifically, FIG. 3 illustrates the deficiency identification system 106 performing a series of acts 300 including an act 302 of monitoring digital responses and digital queries, an act 304 of comparing the number of results with a low-results threshold, and an act 306 of comparing the number of client devices with a client device threshold.

As shown in FIG. 3, the deficiency identification system performs the act 302 of monitoring digital responses and digital queries. In some embodiments, the deficiency identification system 106 monitors digital responses and digital queries received from a plurality of client devices. In particular, the deficiency identification system 106 monitors data corresponding to the digital responses and the digital queries. In some embodiments, the deficiency identification system 106 monitors content (e.g., text) of queries, site visitor identification, the content of results, number of results, whether the site visitor selected a result, number of result selections, and other data.

As illustrated in FIG. 3, the deficiency identification system 106 monitors a digital query 308 comprising the text "lemur coloring book" and the corresponding digital responses. In particular the digital response includes results 310a-310b. As illustrated, the results 310a-310b comprise coloring books for children. In one example, the deficiency identification system 106 also identifies a user who submitted the digital query 308. For instance, the deficiency identification system 106 identifies a unique user based on login information or via cookies. Accordingly, the deficiency identification system 106 may monitor the frequency of low-results queries received from different users as opposed to the same user entering the same query multiple times.

In some embodiments, the deficiency identification system 106 classifies a digital query as a low-response based on various thresholds. Namely, the deficiency identification system 106 may utilize a low-results threshold and/or a client device threshold to identify low-results queries from the digital queries.

For example, as shown in FIG. 3, the deficiency identification system 106 performs the act 304 of comparing the number of results with a low-results threshold. In particular, the deficiency identification system 106 determines a number of results 312 corresponding to the digital responses associated with the digital query 308. To illustrate, the digital response to the digital query 308 includes two results (e.g., the results 310a-310b). The deficiency identification system 106 compares the number of results 312 with a low-results threshold 314.

The deficiency identification system 106 may predetermine the low-results threshold 314. For example, the deficiency identification system 106 classifies a digital query as a low-results query based on determining that a number of results corresponding to the digital query is fewer than the low-results threshold 314 of seven. In some embodiments, the low-results threshold 314 equals one. In such embodiments, the deficiency identification system 106 classifies digital queries as low-results queries only when they yield zero results. In at least one example, the deficiency identification system 106 determines the low-results threshold 314 based on user input. In some embodiments, the deficiency identification system 106 determines the low-results threshold 314 by analyzing historical queries and query responses (e.g., based on an average number of responses or a standard deviation away from an average number of responses).

In addition, or in the alternative, to comparing the number of results 312 with the low-results threshold 314, the deficiency identification system 106 compares a number of clicks with a low-clicks (or low interaction) threshold. Generally, even if a digital query is associated with several results, a site visitor may not click on any of the results if the results are irrelevant to the site visitor's needs. Thus, in some embodiments, the deficiency identification system 106 monitors the number of clicks/interactions received from client devices. To illustrate, the deficiency identification system 106 sets a low-clicks threshold to one. Based on determining that a site visitor did not select any of the provided results (i.e., the number of clicks equals zero) for a digital query, the deficiency identification system 106 classifies the digital query as a low-results query.

As further illustrated in FIG. 3, the deficiency identification system 106 also performs the act 306 of comparing the number of client devices with a client device threshold. Generally, the deficiency identification system 106 further examines digital queries to determine how frequently site visitors provide a digital query (e.g., a query rate). In some embodiments, the deficiency identification system 106 compares a number of client devices 316 providing a digital query with a client device threshold 318 (e.g., a low-results query threshold rate). The deficiency identification system 106 can determine the client device threshold 318. For instance, the deficiency identification system 106 can determine that the client device threshold 318 equals fifty. Based on determining that the client devices 316 providing the digital query "lemur coloring book" meets or exceeds the client device threshold 318, the deficiency identification system 106 classifies the digital query as a low-results query.

In some embodiments, the deficiency identification system 106 utilizes one or both of the low-results threshold and the client device threshold. To illustrate, in some implementations, the deficiency identification system 106 determines that the digital query 308 is a low-results query based on determining that the number of results 312 is lower than the low-results threshold 314. In another embodiment, the deficiency identification system 106 classifies the digital query 308 as a low-results query after determining both that the results 312 is less than the low-results threshold 314 and that the client devices 316 satisfies (e.g., meets or exceeds) the client device threshold 318. The deficiency identification system 106 may also consider any combination of thresholds. For instance, the deficiency identification system 106 classifies the digital query 308 as a low-results query based on determining that the number of clicks is below the low-clicks threshold and the client devices 316 meets the client device threshold 318.

In some embodiments, the series of acts 300 includes an additional act of normalizing the low-results queries. More specifically, the deficiency identification system 106 normalizes monitored data from the digital responses and the digital queries to reduce noise caused by typos or other error. In one implementation, the deficiency identification system 106 generates a histogram of low-results queries per site visitor. The deficiency identification system 106 may apply a Term Frequency Inverse Document Frequency (TF-IDF) reweighting to the histogram. By applying the TF-IDF reweighting, the deficiency identification system 106 scores low-results queries based on significance.

Based on identifying a low-results query, the deficiency identification system 106 extracts features from the low-results query and the digital item list. As mentioned previously, the deficiency identification system 106 generates a feature distance based on the low-results query and the digital item list. FIG. 4 and the corresponding paragraphs provide an overview of the deficiency identification system 106 generating a feature distance representing query relevance to the digital item list in accordance with one or more embodiments. FIG. 4 illustrates the deficiency identification system 106 performing a series of acts 400 comprising an act 402 of extracting a set of item feature vectors, an act 404 of extracting a query feature vector, an act 406 of mapping the feature vectors in an embedding feature space, and an act 408 of determining a feature distance.

As illustrated in FIG. 4, the deficiency identification system 106 performs the act 402 of extracting a set of item feature vectors. In particular, the deficiency identification system 106 extracts a set of item feature vectors 414 from a digital item list 410 utilizing an embedding machine learning model 412. The set of item feature vectors 414 summarize content of the digital item list 410. In some embodiments, the deficiency identification system 106 extracts the set of item feature vectors 414 by processing textual data from the digital item list 410. In some implementations, the deficiency identification system 106 processes the digital item list 410 utilizing natural language processing (NLP). For example, NLP can be in the form of data lemmatization, stemming, stop word removal, parts of speech tagging, word chunk extraction, and other forms. The deficiency identification system 106 then passes the processed text through the embedding machine learning model 412 to extract embeddings for core content of the digital item list 410. In some implementations, the embedding machine learning model 412 comprises a language model. For example, the embedding machine learning model 412 may comprise a word embedding neural network (such as Word2vec).

As shown, the deficiency identification system also performs the act 404 of extracting a query feature vector. In particular, the deficiency identification system 106 extracts a query feature vector 418 from a low-results query 416 by utilizing the embedding machine learning model 412. The query feature vector 418 represents the content of the low-results query 416. In some embodiments, the deficiency identification system 106 utilizes the same embedding machine learning model as it uses to extract the item feature vectors 414 described above. For instance, the deficiency identification system 106 may utilize a language model and/or an embedding neural network to generate the query feature vector 418.

As further illustrated in FIG. 4, the deficiency identification system 106 performs the act 406 of mapping the feature vectors in an embedding feature space. More specifically, the deficiency identification system 106 maps the set of item feature vectors 414 and the query feature vector 418 to an embedding feature space. For instance, and as illustrated in FIG. 4, the deficiency identification system 106 maps a query feature vector 424, an item feature vector 420 and a neighboring item feature vector 422 within an embedding feature space. While FIG. 4 illustrates the mapping of a single item feature vector, the deficiency identification system 106 may map several item feature vectors—each representing an item in a digital item list.

In some implementations, the deficiency identification system 106 defines a digital item list subspace within the embedding feature space based on the set of item feature vectors. Generally, the digital item list subspace comprises an area where items of the digital item list are represented. For instance, the deficiency identification system 106 creates a digital item list subspace in which the set of item feature vectors all reside. The deficiency identification system 106 defines a digital item list subspace within the embedding feature space that includes content embeddings for items within the digital item list.

In some embodiments, the deficiency identification system 106 further expands the digital item list subspace by including neighboring embeddings within the embedding feature space. More specifically, the deficiency identification system 106 identifies embeddings that neighbor content embeddings for items within the digital item list. For example, as illustrated in FIG. 4, the deficiency identification system 106 maps the item feature vector 420 and the neighboring item feature vector 422. The neighboring item feature vector 422 comprises a content embedding generated by the embedding machine learning model. The deficiency identification system 106 may identify the neighboring item feature vector 422 based on a neighbor radius 428 surrounding the item feature vector 420. To illustrate, the deficiency identification system 106 determines that the neighboring item feature vector 422 is within the neighbor radius 428 of the item feature vector 420 and includes the neighboring item feature vector 422 within the digital item list subspace. In other embodiments, the deficiency identification system 106 utilizes other methods to identify the neighboring item feature vector 422. For example, the deficiency identification system 106 may conduct a linear search or space partitioning of feature vectors to identify the neighboring item feature vector 422.

By expanding the digital item list subspace (e.g., adding neighboring item feature vectors), the deficiency identification system 106 can determine distances more flexibly. For example, an expanded digital item list subspace defined by a digital item list (and neighboring items) can give a more flexible view of relatedness than defining the digital item list subspace based solely on items in the digital item list.

FIG. 4 also illustrates the deficiency identification system 106 performing the act 408 of determining a feature distance. In particular, the deficiency identification system 106 determines a feature distance between the query feature vector and the set of item feature vectors. The feature distance represents relevance between the low-results query and content in the digital item list. As illustrated, the deficiency identification system 106 determines a feature distance 426a between the query feature vector 424 and the item feature vector 420. For example, the deficiency identification system 106 determines a distance between the query feature vector 424 and the nearest item feature vector. In some embodiments, the deficiency identification system 106 determines a feature distance 426b between the query feature vector 424 and the neighboring item feature vector 422.

In some implementations, the deficiency identification system 106 performs the act 408 of determining the feature distance by determining a distance between the query feature vector 424 and the digital item list subspace within the embedding space (e.g., the digital item list subspace or the expanded digital item list subspace discussed above). Indeed, upon defining a digital item list subspace (or expanded digital item list subspace), the deficiency identification system 106 can determine a distance within the embedding space between the digital item list subspace (or expanded digital item list subspace) and a query feature vector.

In some implementations, the deficiency identification system 106 determines a variety of different distance features. For example, the deficiency identification system 106 determines a first distance between the query feature vector 424 and then nearest boundary of the digital item list subspace. In addition, the deficiency identification system 106 determines a second distance between the query feature vector 424 and a centroid of the digital item list subspace. Moreover, the deficiency identification system 106 determines a third distance between the query feature vector 424 and the nearest item feature vector from the digital item list.

In some implementations, the deficiency identification system 106 defines the digital item list subspace based on an updated digital item list. The deficiency identification system 106 may define or update the digital item list subspace when items are added or removed from the digital item list. Based on identifying a low-results query, the deficiency identification system 106 computes the distance from the query feature vector 424 to the digital item list subspace.

In addition to determining a feature distance between the query feature vector and the set of item feature vectors, the deficiency identification system 106 also generates additional features including a named entity and a time series feature. FIG. 5 illustrates the deficiency identification system 106 generating a named entity in accordance with one or more embodiments.

In particular, FIG. 5 illustrates the deficiency identification system 106 generating a named entity 506 from a low-results query 502 by utilizing an entity matching model 504. In particular, the deficiency identification system 106 inputs the low-results query 502 into the entity matching model 504 to determine whether the low-results query 502 includes a named entity. An entity matching model (e.g., named entity recognition model) can include a variety of computer-implemented models that extract or identify named entities from digital text. For example, an entity matching model can locate and classify named entities into classes or categories, such as person names, geopolitical entities, locations organizations, facilities (e.g., building, airport, highway), products, events, works of art, laws (e.g., bills, statutes, etc.), or languages. In some embodiments, named entities also includes languages, countries, nationalities, money, quantities, or time.

Thus, named entities can include real-world objects that can be denoted through a proper noun (e.g., proper nouns identifying persons, places, or thing). To illustrate, in the query, "Adobe digital image editing software Photoshop," the entity matching model 504 can tag or highlight the named entities as follows: Adobe (named entity: organization) digital image editing software Photoshop (named entity: product).

The deficiency identification system 106 can utilize a variety of model architectures or formulations for the entity matching model 504. In some embodiments, the deficiency identification system 106 utilizes linguistic grammar-based techniques, statistical models, and/or machine learning models. For example, the deficiency identification system 106 can utilize spaCy, OpenNLP, or GATE as the entity matching model 504.

As mentioned, the deficiency identification system 106 can generate a time series feature based on a low-results query. FIG. 6 illustrates the deficiency identification system 106 generating a time series feature in accordance with one or more embodiments. In particular, the deficiency identification system 106 generates a time series feature reflects time, occurrence, or frequencies with regard to when user client devices provided the low-results query.

FIG. 6 illustrates the deficiency identification system 106 generating a time series feature 608 of a low-results query 602 by utilizing a time series model 604. In at least one example, the deficiency identification system 106 determines occurrences of when client devices provide the low-results query 602. More specifically, the deficiency identification system 106 monitors the reception of the low-results query 602 from a plurality of client devices associated with site visitors. The deficiency identification system 106 tracks times and dates when client devices provide the low-results query 602.

In one or more embodiments, the deficiency identification system 106 generates time series features as a classification. For example, as shown in FIG. 6, the deficiency identification system 106 classifies the occurrence as at least one of sporadic, peaking, seasonal, or recurrent. In some embodiments, the deficiency identification system 106 utilizes different classifications. For instance, the deficiency identification system 106 may utilize domain expert defined features to define what qualifies as seasonality. Additionally, or alternatively, the deficiency identification system 106 defines a time series representation. The deficiency identification system 106 determines whether an occurrence of when client devices provide the low-results query deviates from parameters of the time series representation. The deficiency identification system 106 utilizes deviations from the time series representation as the time series feature 608.

In some embodiments, the deficiency identification system 106 utilizes the time series model 604 to generate other time series features. For example, the deficiency identification system 106 can utilize the time series model 604 that includes a neural network to generate an embedding reflecting frequency of the low-results query 602. The deficiency identification system 106 can utilize such an embedding as the time series feature 608. The time series feature 608 can also include other signals, such as a low-results query histogram reflecting the number of queries corresponding to different time blocks.

As mentioned previously, in some embodiments the deficiency identification system 106 utilizes a deficiency prediction model to analyze extracted features and generate a deficiency confidence score that indicates a demand for an item and an item deficiency in the digital item list. FIG. 7A illustrates the deficiency identification system 106 training (e.g., modifying parameters of) a deficiency prediction model, and FIG. 7B illustrates the deficiency identification system 106 utilizing the deficiency prediction model in accordance with one or more embodiments.

FIG. 7A illustrates the deficiency identification system 106 learning parameters for a deficiency prediction model 708. Generally, the deficiency identification system 106 analyzes extracted features—including a named entity 702, a feature distance 704, and a time series feature 706—utilizing the deficiency prediction model 708.

As shown in FIG. 7A, the deficiency identification system 106 utilizes the deficiency prediction model 708 to generate a predicted deficiency confidence score 710. The deficiency identification system 106 determines a deficiency prediction 712 based on the predicted deficiency confidence score 710. For example, the deficiency identification system 106 compares the predicted deficiency confidence score 710 with a confidence threshold. If the deficiency identification system 106 determines that the predicted deficiency confidence score 710 satisfies the confidence threshold, the deficiency identification system 106 identifies a predicted deficiency.

As illustrated in FIG. 7A, the deficiency identification system 106 also determines a loss 714. The deficiency identification system 106 can determine the loss 714 utilizing a supervised or unsupervised approach. For example, the deficiency identification system 106 can determine the loss 714 by comparing the deficiency prediction 712 with a training dataset 716 (e.g., a known ground truth deficiency classification) and/or user input 718. Upon identifying the loss 714, the deficiency identification system 106 adjusts the parameters of the deficiency prediction model 708 to reduce the measure of loss.

As mentioned, in some embodiments, the deficiency prediction model 708 comprises a supervised model that the deficiency identification system 106 trains utilizing the (optional user input 718. To illustrate, the deficiency identification system 106 inputs extracted features for a low-results query. The deficiency identification system 106 utilizes the deficiency prediction model 708 to generate the predicted deficiency confidence score 710 and the predicted deficiency 712. The deficiency identification system 106 provides a deficiency notification based on the predicted deficiency 712. The deficiency identification system 106 receives the user input 718 that confirms or undermines the existence of an item deficiency. The deficiency identification system 106 modifies parameters of the deficiency prediction model 708 to reduce the loss 714 based on the user input 718. Thus, the deficiency identification system 106 can continuously improve/update parameters based on user input.

FIG. 7B illustrates the deficiency identification system 106 applying a trained deficiency prediction model in accordance with one or more embodiments. As illustrated in FIG. 7B, the deficiency identification system 106 performs an act 720 of monitoring a plurality of digital queries and digital responses to identify a low-results query 722. The deficiency identification system 106 performs an act 724 of extracting features from the low-results query 722. The extracted features include a named entity 726, a feature distance 728, and a time series feature 730. The deficiency identification system 106 inputs the extracted features into the deficiency prediction model 708 to generate a deficiency confidence score 734. Based on the deficiency confidence score 734, the deficiency identification system 106 makes a deficiency determination 736. Based on the deficiency determination 736, the deficiency identification system 106 performs an act 738 of providing a notification. More specifically, the deficiency identification system 106 provides a notification 740 for display via a graphical user interface of a user client device to indicate an item deficiency.

As illustrated in FIG. 7B, the deficiency identification system 106 makes a deficiency determination 736 based on the deficiency confidence score 734. In some embodiments, the deficiency determination 736 indicates a demand for an item recited by the low-results query and whether the item is within the digital item list. In some implementations, the deficiency identification system 106 generates the deficiency determination 736 based on comparing the deficiency confidence score 734 to a threshold deficiency confidence score. For instance, the deficiency identification system 106 determines an item deficiency based on determining that the deficiency confidence score 734 meets a threshold deficiency confidence score.

Figure 8A:
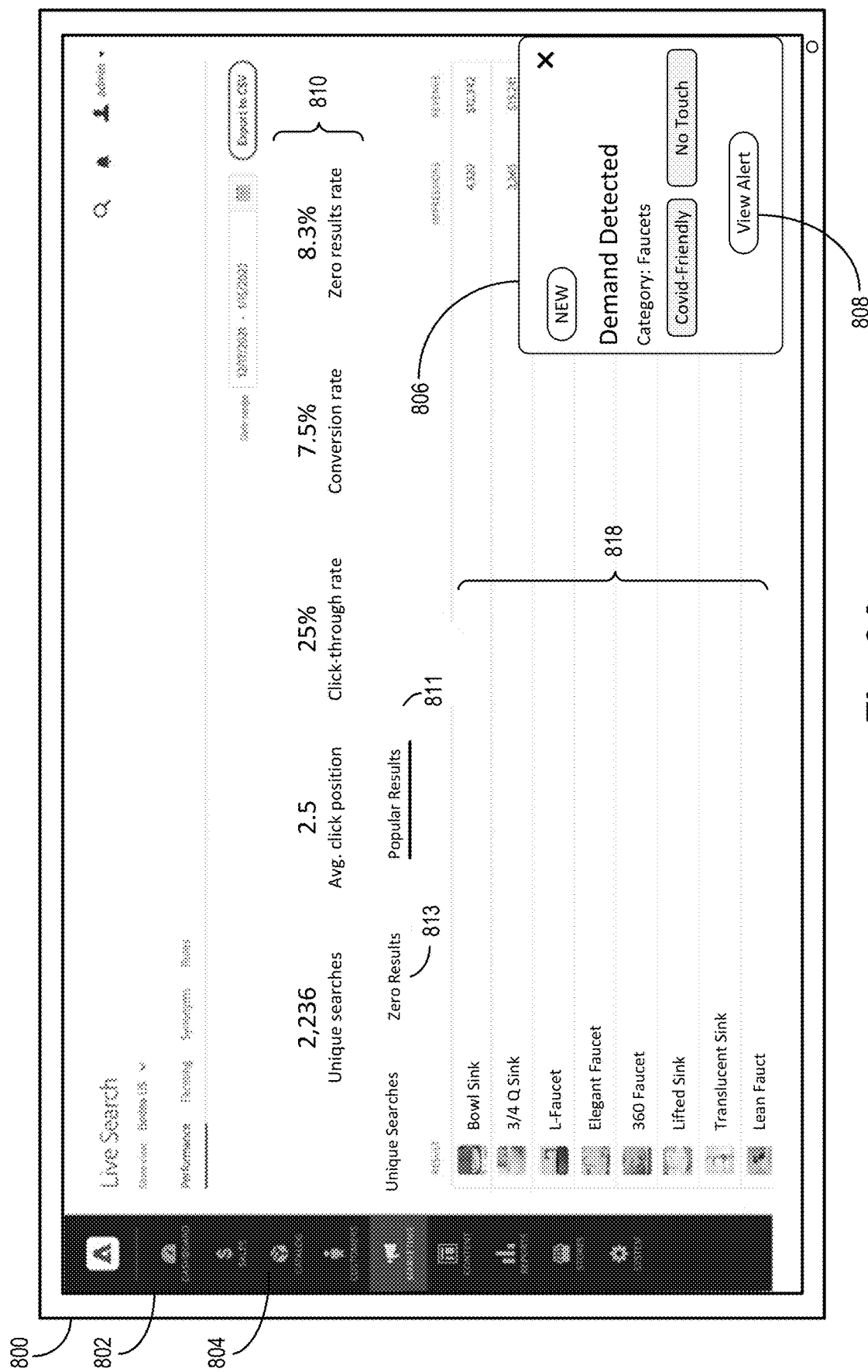
FIGS. 8A-8B illustrate a series of graphical user interfaces for presenting a deficiency notification in accordance with one or more embodiments of the present disclosure.
Figure 8B:
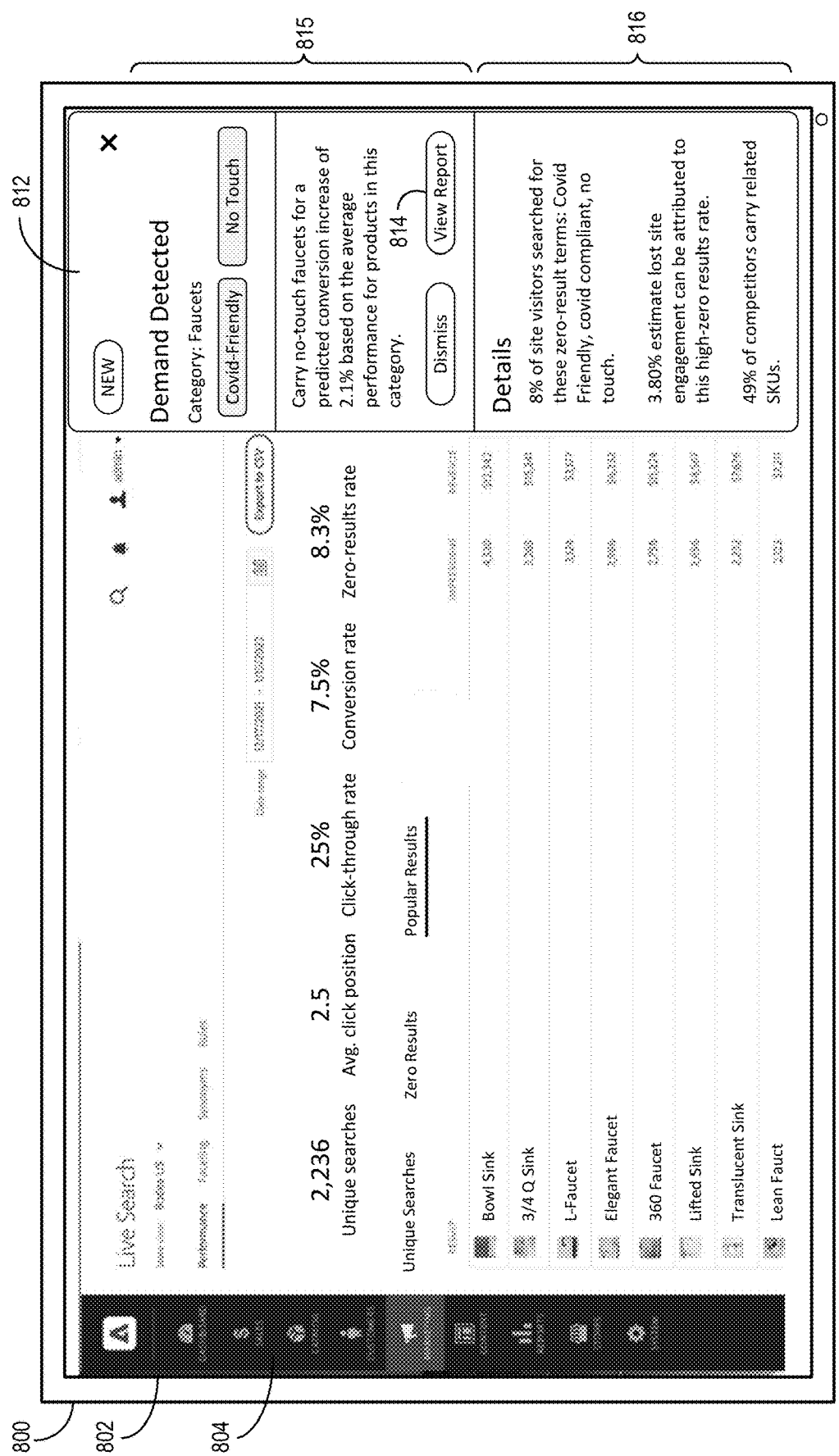

As mentioned previously, in some implementations the deficiency identification system 106 provides a deficiency notification for display via a graphical user interface at a user client device. FIGS. 8A-8B illustrate a series of graphical user interfaces including deficiency notifications in accordance with one or more embodiments. The deficiency identification system 106 may also present additional information regarding item deficiencies. FIGS. 8C-8F illustrate a series of graphical user interfaces comprising elements for providing additional information regarding item deficiencies in accordance with one or more embodiments.

FIG. 8A illustrates a query overview graphical user interface 804 presented on a screen 802 of a user client device 800 (e.g., an administrator client device such as the user client device 108 in FIG. 1). As illustrated, the query overview graphical user interface 804 includes a query summary 810 and a deficiency notification 806. Generally, the query overview graphical user interface 804 displays an overview of digital queries provided by site visitor client devices. For example, the query overview graphical user interface 804 includes the query summary 810 that summarizes digital query and digital response data. For example, the query summary 810 indicates a number of unique searches, an average click position, a click-through rate, a conversion rate, and a zero results rate. In some embodiments, the query summary 810 includes additional information such as a low-results rate.

FIG. 8A also shows how the deficiency identification system 106 organizes digital response data within the query overview graphical user interface 804. For instance, the query overview graphical user interface 804 includes a popular results element 811. Based on selection of the popular results element 811 user client device 800 updates the query overview graphical user interface 804 to include a listing 818 of popular results. The query overview graphical user interface 804 also includes a zero results element 813. Based on user selection of the zero results element 813, the user client device 800 updates the listing 818 to display digital queries linked with zero results. Additionally, or alternatively, the deficiency identification system 106 provides a low-results element for display within the query overview graphical user interface 804.

The query overview graphical user interface 804 illustrated in FIG. 8A includes the deficiency notification 806. Generally, the deficiency notification 806 indicates an item deficiency based on a deficiency confidence score corresponding to a low-results query. For example, the deficiency notification 806 indicates that a demand has been detected. The deficiency notification 806 further includes item deficiency information including a category (e.g., faucets) as well as item characteristics (e.g., "covid-friendly," and "no touch"). The category indicates a broad class to which an item belongs. The item characteristics further define specifics of the item deficiency.

The deficiency notification 806 illustrated in FIG. 8A includes a notification expansion element 808. Based on user selection of the notification expansion element 808, the user client device 800 updates the query overview graphical user interface 804 to include additional information regarding the item deficiency. In some embodiments, based on user selection of the notification expansion element 808, the deficiency identification system 106 provides an expanded deficiency notification for display at the user client device 800.

FIG. 8B illustrates an expanded deficiency notification 812 displayed within the query overview graphical user interface 804 presented on the screen 802 of the user client device 800. The expanded deficiency notification 812 includes an item deficiency summary 815, a view report element 814, and item deficiency details 816. Generally, the item deficiency summary 815 includes an overview of the item deficiency. For example, the item deficiency summary 815 includes item deficiency information provided by the deficiency notification 806 in FIG. 8A. The item deficiency summary 815 also includes additional item deficiency information. As illustrated in FIG. 8B, the item deficiency summary 815 includes a predicted benefits summary. For example, the item deficiency summary 815 includes an indication that carrying the item "no-touch faucets" would lead to a predicted benefit of a conversion increase of 2.1%.

The expanded deficiency notification 812 further includes the item deficiency details 816. The item deficiency details 816 include a summary of low-results query data and corresponding digital response data. As illustrated in FIG. 8B, the item deficiency details 816 indicates a percentage of client devices that provided zero-results or low-results queries. The item deficiency details 816 also indicates an estimated lost site engagement, and a percentage of competitors that carry the deficient item.

As illustrated in FIG. 8B, the expanded deficiency notification 812 includes the view report element 814. Based on user selection of the view report element 814, the deficiency identification system 106 provides additional item deficiency data for display via the user client device. For instance, in some embodiments, based on an indication of user selection of the view report element 814, the user client device 800 updates the screen 802 to display an item deficiency details user interface.

Figure 8C:
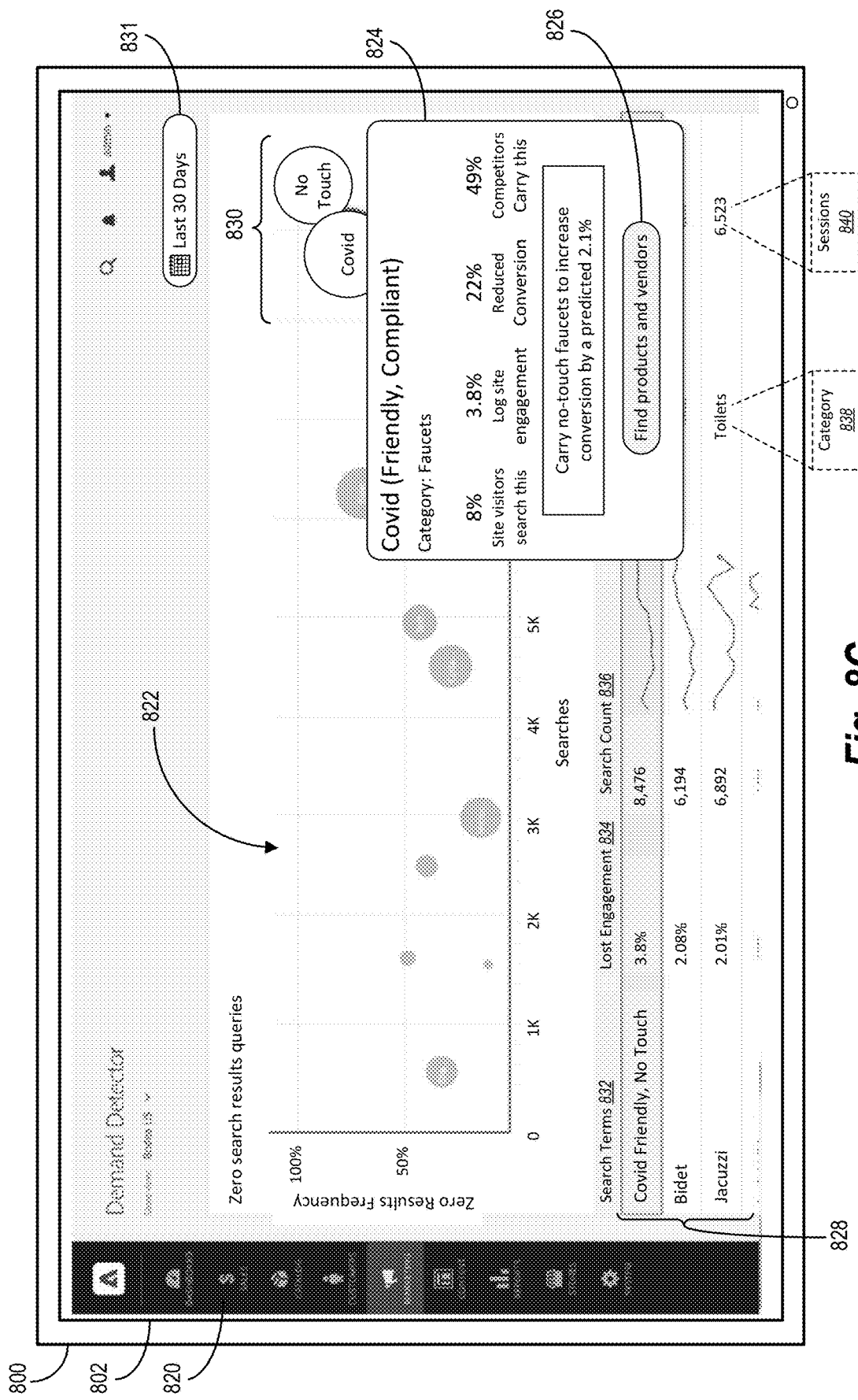

FIG. 8C illustrates an item deficiency details user interface 820 presented via the screen 802 of the user client device 800. The item deficiency details user interface 820 presents low-results queries in an intuitive layout. Generally, the item deficiency details user interface 820 presents low-results query data and provides a functionality of highlighting data for a specific low-results query.

The item deficiency details user interface 820 illustrated in FIG. 8C includes a bubble chart 822 that indicates a number of client devices that provided a given low-results query (e.g., "searches"), a frequency with which client devices provided a given low-results query (e.g., "zero results frequency"), and a deficiency confidence score (e.g., the size or magnitude of the bubbles). More specifically, the bubble chart 822 includes bubbles 830. The size of the bubbles 830 indicates a higher deficiency confidence score relative to the other bubbles in the bubble chart 822. The bubbles 830 correspond to low-search queries "covid" and "no touch." Based on an indication of user selection of the "covid" bubble, the user client device 800 updates the item deficiency details user interface 820 to include a query-specific notification 824.

The query-specific notification 824 provides details regarding a specific low-results query. In particular, the query-specific notification 824 illustrated in FIG. 8C provides details regarding the low-results query "Covid." As indicated, the low-results query "covid" is within the faucet category indicating that the deficiency identification system 106 received queries for covid-friendly faucets. The query-specific notification 824 includes various query-specific metrics including a percentage of site visitors who searched for the low-results query, a percentage of log site engagement, a predicted reduced conversion, and a percentage of competitors who carry the item corresponding to the low-results query. Furthermore, the deficiency identification system 106 predicts an increased conversion as a product of adding the low-results query item to the digital item list.

Figure 8D:
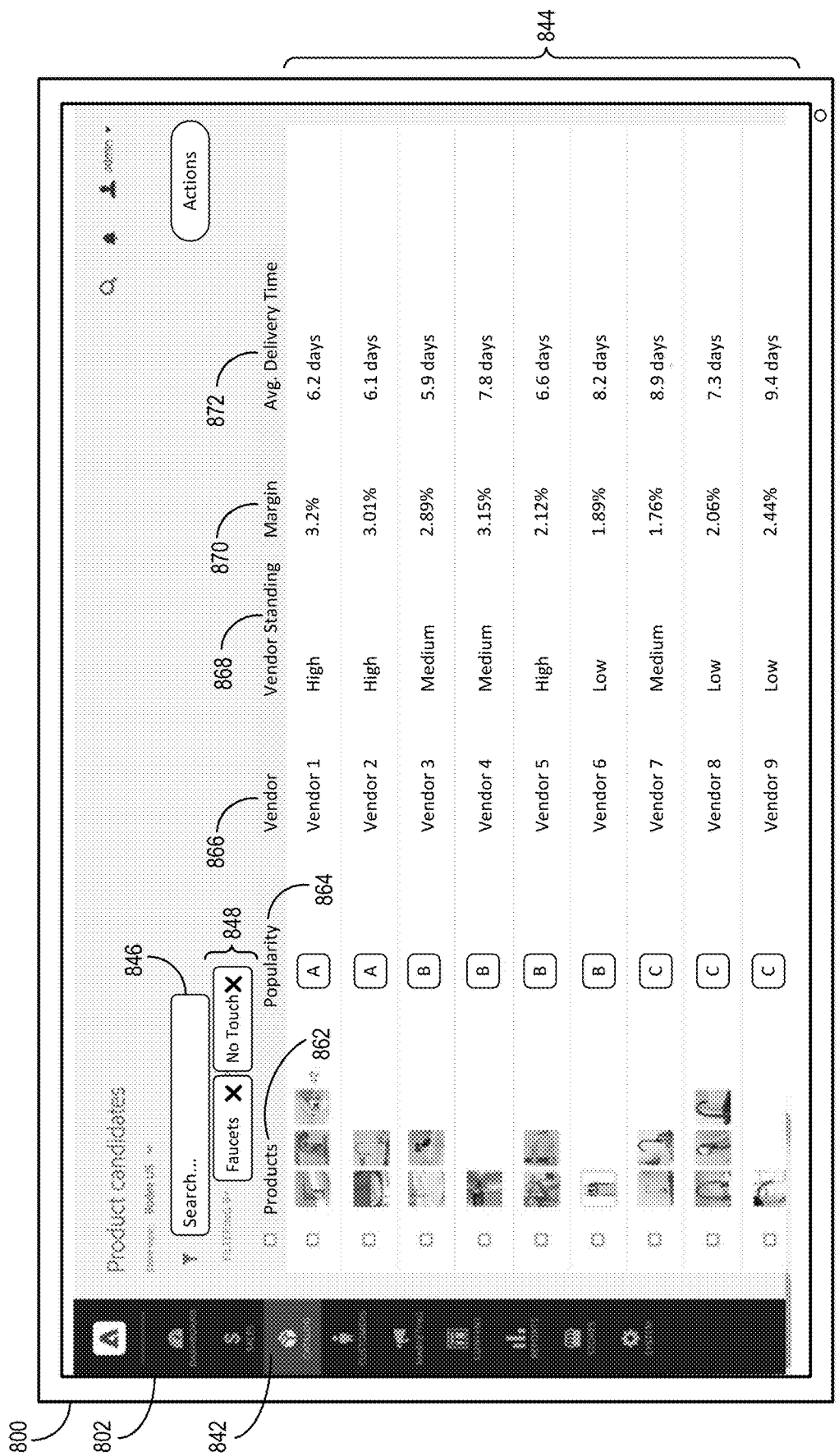
Figure 8E:
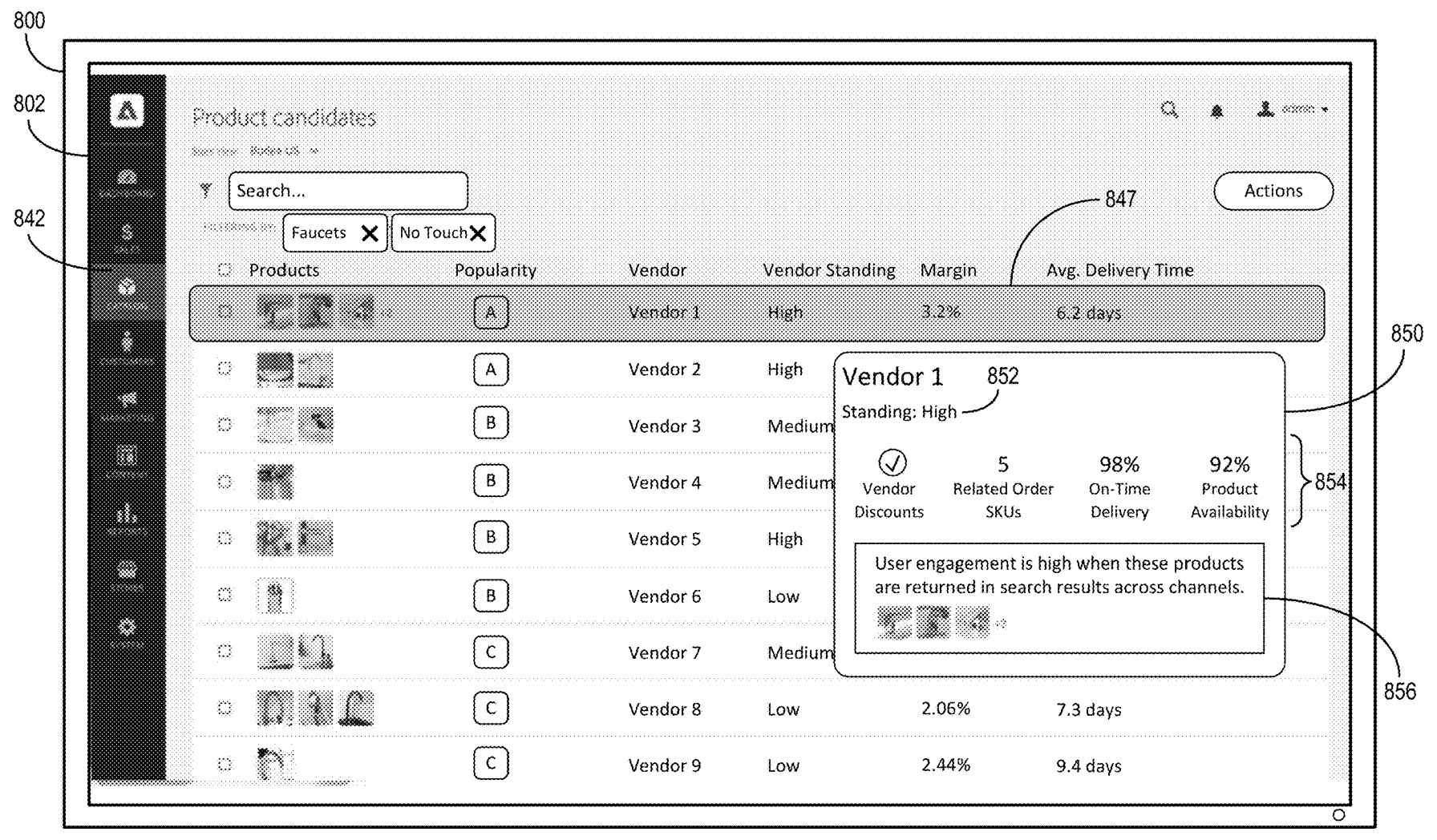

The query-specific notification 824 illustrated in FIG. 8C includes an item source element 826. Based on an indication of user selection of the item source element 826, the deficiency identification system 106 provides an item source graphical user interface for display via the user client device. FIGS. 8D-8F illustrate an example item source graphical user interface in accordance with one or more embodiments.

As further illustrated in FIG. 8C, the item deficiency details user interface 820 includes low-results query data 828. The low-results query data 828 comprises a listing of low-results queries graphed within the bubble chart 822. More specifically, the low-results query data 828 lists the low-results queries 832, lost engagement 834, query count 836, query category 838, and sessions 840. The low-results queries 832 indicates the content of the low-result queries provided by the client devices. The lost engagement 834 indicates site visitor lost engagement due to the digital responses to the low-result query. The lost engagement 834 may reflect data from various engagement metrics including conversion rate, pages per session, net promoter score, average session duration, and other engagement metrics. The query count 836 indicates a number of client devices that provided the low-results query. As further illustrated in FIG. 8C, the query count 836 also includes a trend element (e.g., a line graph) reflecting the count of client devices providing the low-results query over time. The low-results query data 828 also includes the query category 838 indicating a general classification corresponding to the low-results query (e.g., faucet, toilet, etc.). The sessions 840 can indicate pages per session or session durations of client devices that provided the low-results query.

FIG. 8C further includes a time period selection element 831. In particular, the deficiency identification system 106 can provide, for display, low-results queries corresponding to specific time periods. As illustrated, the item deficiency details user interface 820 in FIG. 8C displays low-results queries from the last 30 days. Based on an indication of user selection of the time period selection element 831, the deficiency identification system 106 provides low-results query data for different time periods (e.g., within the last three months, year, or a specified window of time).

As mentioned, the deficiency identification system 106 provides information regarding item sources for items corresponding to a low-results query. Generally, the deficiency identification system 106 provides an item source graphical user interface that identifies one or more item sources from which a user may obtain items to fill deficiencies in the digital item list. FIGS. 8D-8F illustrate a series of item source graphical user interfaces and functionalities accessible through various user interface elements in accordance with one or more embodiments.

FIG. 8D illustrates an item source graphical user interface 842 presented on the screen 802 of the user client device 800. The item source graphical user interface 842 includes indications of item sources 844. The item sources 844 comprises a list of potential item sources (e.g., vendors) from which a user can obtain a supply of deficiency items. As illustrated, the item sources 844 can comprise a ranked listing of item sources. In particular, the deficiency identification system 106 determines item source rankings for the one or more item sources associated with an item and lists the one or more item sources based on the item source rankings. The deficiency identification system 106 can rank item sources based on several different metrics including popularity, reliability, profit margin, delivery time, production capacity, quality, performance, risk, environmental impact, and other metrics.

In some implementations, the user client device 800 updates the order of the item sources 844. In one example, the item sources 844 are rearranged based on different metrics. For instance, based on user selection of any of the column headers, the user client device 800 rearranges the item sources 844 based on the selected column header.

The item source graphical user interface 842 illustrated in FIG. 8D also includes several metrics for each of the item sources. The item sources 844 displays items 862 offered by item sources. In some embodiments, the item sources 844 include images of items relevant to the low-results query. The item source graphical user interface 842 also includes a popularity 864. Generally, the deficiency identification system 106 determines a popularity score for an item source based on how many other users utilize the item source. The item source graphical user interface 842 includes item source identifiers 866. The item source identifiers 866 comprise names of the one or more item sources listed within the item source graphical user interface 842. The item source graphical user interface 842 also includes item source standings 868. The item source standings 868 reflects standings of the item sources. The item source graphical user interface 842 also includes margins 870. The margins 870 indicate distributor markup for the item source. Additionally, the item source graphical user interface 842 includes average delivery times 872 that reflect average times of delivery for a given item source.

As further illustrated in FIG. 8D, the item source graphical user interface 842 includes a search element 846. Based on user interaction with the search element 846, the deficiency identification system 106 identifies relevant item sources. The item source graphical user interface 842 also includes filters 848. The deficiency identification system 106 may update the item source graphical user interface 842 to display different sets of item sources based on user interaction with the filters 848.

Based on user selection of an item source, the deficiency identification system 106 provides additional information for display. FIG. 8E illustrates an example item source notification in accordance with one or more embodiments. In particular, FIG. 8E illustrates the item source graphical user interface 842 including an item source notification 850 corresponding to an item source 847.

As illustrated in FIG. 8E, the user client device 800 highlights the item source 847 based on user selection of the item source 847. Based on this selection, the deficiency identification system 106 provides, for display via the item source graphical user interface 842, the item source notification 850. The item source notification 850 provides information specific to an item source. For instance, the item source notification 850 includes an item source standing 852. The item source notification 850 also includes item source metrics 854. Examples of the item source metrics 854 include an indication of item source discounts, related order Stock Keeping Units (SKU), percentage of on-time deliveries, and item availability for the deficient item.

The item source notification 850 illustrated in FIG. 8E further includes a predicted effects element 856. The predicted effects element 856 includes a predicted effect of adding the item to the digital item list. As illustrated, the predicted effects element 856 indicates that adding the item to the digital item list results in a high user engagement.

The deficiency identification system 106 provides access to various functionalities through the item source graphical user interface 842. FIG. 8F illustrates example functionalities provided via the item source graphical user interface 842 in accordance with one or more embodiments. FIG. 8F illustrates the item source graphical user interface 842 including item sources 886a-886b. Selections 860a-860b indicate that a user has selected the item sources 886a-886b. Based on user selection of an actions element 880, the deficiency identification system 106 provides various actions for display via the item source graphical user interface 842.

As illustrated, the deficiency identification system 106 provides an add item element 882 based on user selection of the actions element 880. Based on user selection of the add item element 882, the deficiency identification system 106 adds one or more items to the digital item list. In some embodiments, the deficiency identification system 106 provides additional prompts to the user as part of adding the one or more items to the digital item list. More specifically, the deficiency identification system 106 provides additional prompts for communicating with the item source to establish a supply of the item. In some embodiments, the deficiency identification system 106 adds items that are displayed in conjunction with the selected item source. For instance, the item source 886a corresponds with five items pictured. The item source 886b corresponds with two items. Based on the selections 860a-860b, the deficiency identification system 106 adds all displayed items to the digital item list. In another implementation, the deficiency identification system 106 provides an item selection prompt for a user to select desired items to add to the digital item list.

FIG. 8F further illustrates a digital messaging element 884. Based on user selection of the digital messaging element 884, the deficiency identification system 106 provides a digital message user interface for display via the user client device 800. More specifically, the deficiency identification system 106 sends information relating to the item sources 886a-886b to selected client devices. The digital message user interface includes a custom message element where a user can enter messages to send together with the item source information. Information relating to the item sources 886a-886b can include item source identities, selected items, and other data.

Figure 9:
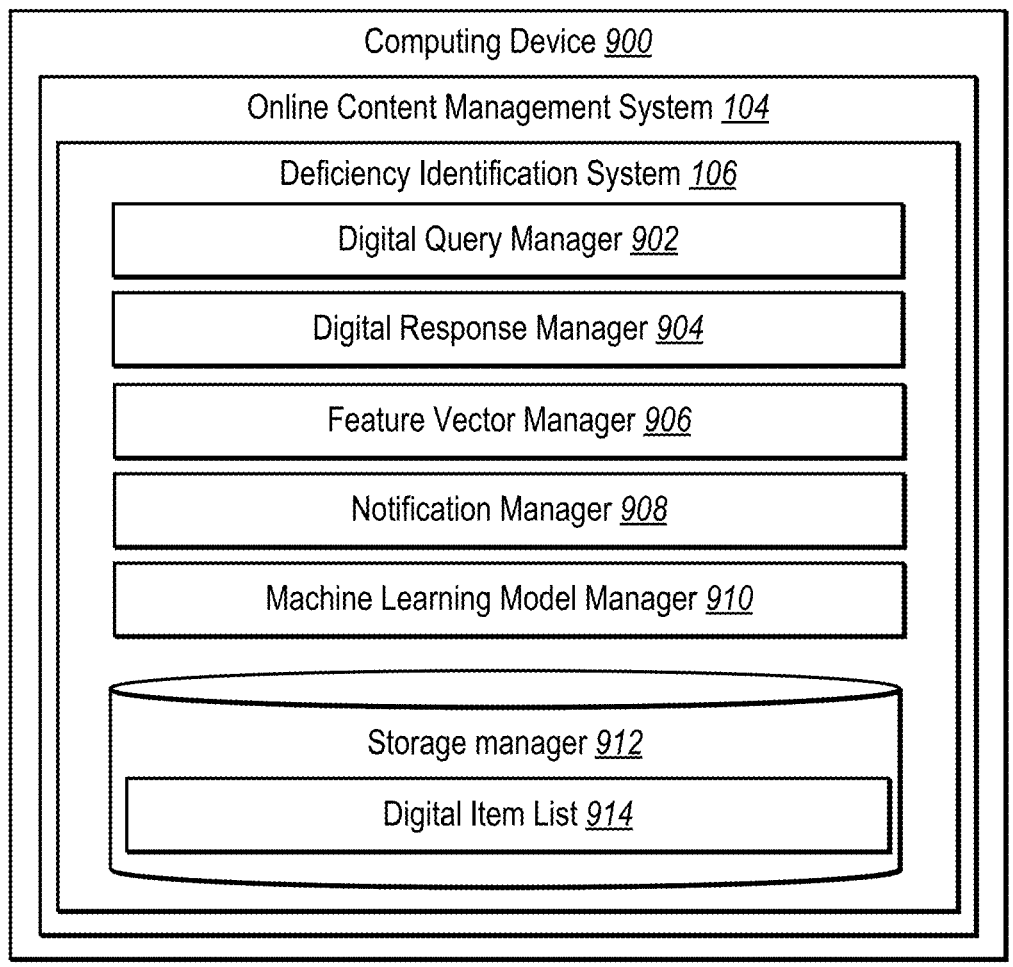
FIG. 9 illustrates a schematic diagram of an example architecture of the deficiency identification system in accordance with one or more embodiments of the present disclosure.

FIG. 9 provides additional detail regarding various components and capabilities of the deficiency identification system 106 in accordance with one or more embodiments. Generally, FIG. 9 illustrates the deficiency identification system 106 implemented by the online content management system 104 on a computing device 900 (e.g., the user client device 108 and/or the server device(s) 102). As shown, the deficiency identification system 106 includes, but is not limited to a digital query manager 902, a digital response manager 904, a feature vector manager 906, a notification manager 908, a machine learning manager 910, and a storage manager 912. The storage manager 912 includes a digital item list 914.

The digital query manager 902 receives and manages digital queries provided by client devices associated with site visitors. The digital response manager 904 generates, stores, and manages digital responses to the digital queries. The feature vector manager 906 extracts features from the digital queries and the digital item list. The notification manager 908 generates notifications for display via the user client device. For instance, the notification manager 908 generates a deficiency notification based on a deficiency confidence score. The machine learning manager 910 manages machine learning models including a deficiency prediction model. More specifically, the machine learning manager 910 inputs extracted features into the deficiency prediction model to generate a deficiency confidence score. The storage manager 912 stores the digital item list 914 comprising items that are viewable via a website.

In some embodiments, the deficiency identification system 106 is implemented as part of the online content management system 104 in a distributed system of the server devices for identifying item deficiencies. Additionally, or alternatively, the deficiency identification system 106 is implemented on a single computing device such as the server device(s) 102 or the user client device 108 of FIG. 1.

In one or more embodiments, each of the components of the deficiency identification system 106 are in communication with one another using any suitable communication technologies. Additionally, the components of the deficiency identification system 106 are in communication with one or more other devices including the user client device 108 illustrated in FIG. 1. Although the components of the deficiency identification system 106 are shown as separate in FIG. 9, any of the subcomponents may be combined into fewer components, such as into a single component or divided into more components as may serve a particular implementation. Furthermore, although the components of FIG. 9 are described in connection with the deficiency identification system 106, at least some components for performing operations in conjunction with the deficiency identification system 106 described herein may be implemented on other devices within the environment.

The components of the deficiency identification system 106 can include software, hardware, or both. For example, the components of the deficiency identification system 106 can include one or more instructions stored on a computer-readable storage medium and executable by processors of one or more computing devices (e.g., the user client device 108). When executed by the one or more processors, the computer-executable instructions of the deficiency identification system 106 can cause the computing devices to perform deficiency identification methods described herein. Alternatively, the components of the deficiency identification system 106 can comprise hardware, such as a special purpose processing device to perform a certain function or group of functions. Additionally, or alternatively, the components of the deficiency identification system 106 can include a combination of computer-executable instructions and hardware.

Furthermore, the components of the deficiency identification system 106 performing the functions described herein with respect to the deficiency identification system 106 may, for example, be implemented as part of a stand-alone application, as a module of an application, as a plug-in for applications, as a library function or functions that may be called by other applications, and/or as a cloud-computing model. Thus, the components of the deficiency identification system 106 may be implemented as part of a stand-alone application on a personal computing device or a mobile device. Alternatively, or additionally, the components of the deficiency identification system 106 may be implemented in any application that provides image management, including, but not limited to ADOBE® EXPERIENCE CLOUD, such as ADOBE® MAGENTO®, ADOBE® COMMERCE CLOUD, ADOBE® ANALYTICS, ADOBE® MARKETING CLOUD™, and ADOBE® ADVERTISING CLOUD. The foregoing are either registered trademarks or trademarks of Adobe Inc. in the United States and/or other countries.

Figure 10:
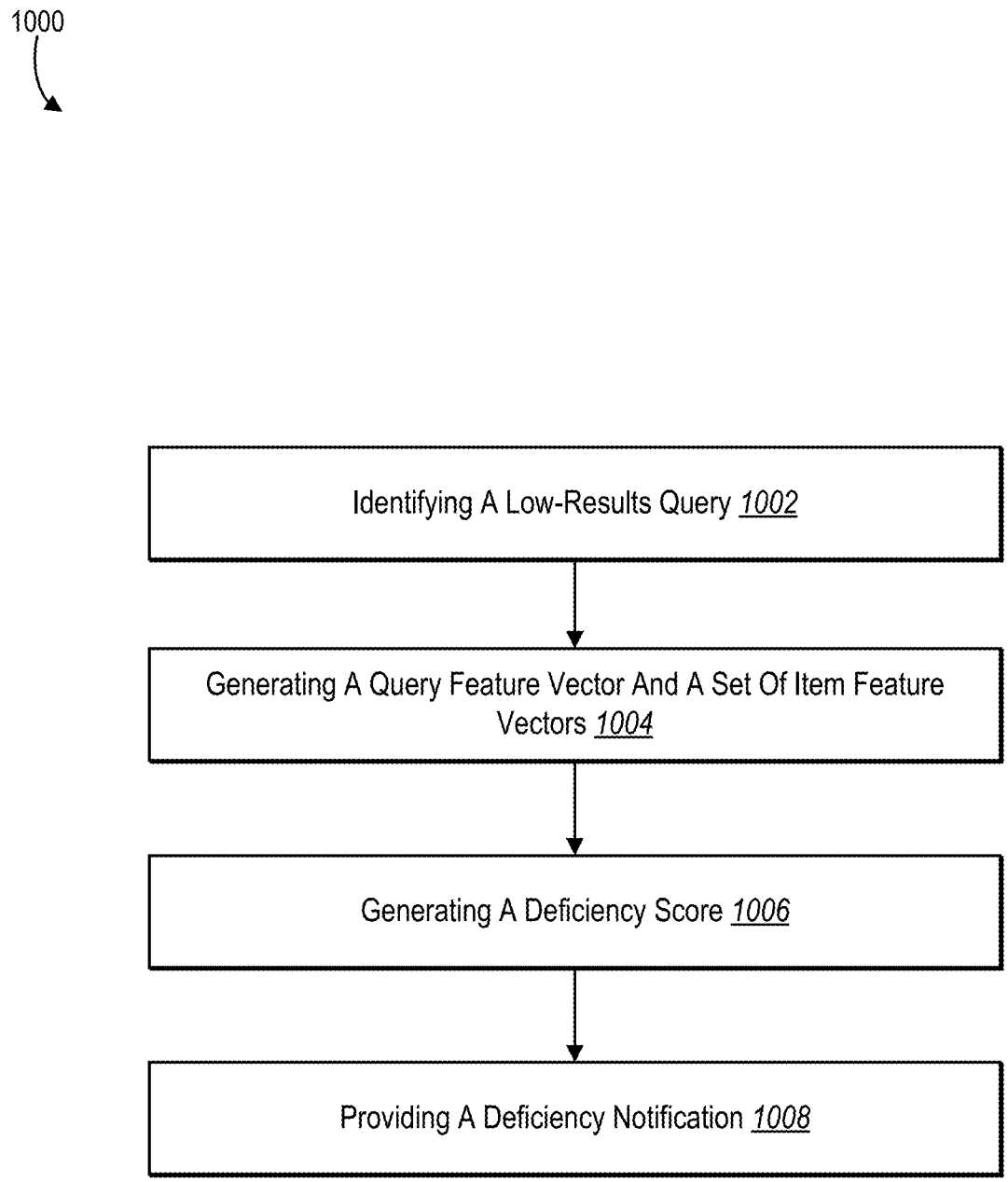
FIG. 10 illustrates a series of acts for generating a deficiency prediction score and displaying a deficiency notification in accordance with one or more embodiments of the present disclosure.

FIGS. 1-9, the corresponding text, and the examples provide a number of different methods, systems, devices, and non-transitory computer-readable media of the deficiency identification system 106. In addition to the foregoing, one or more embodiments can also be described in terms of flowcharts comprising acts for accomplishing the particular result, as shown in FIG. 10. The series of acts illustrated in FIG. 10 may be performed with more or fewer acts. Further, the illustrated acts maybe performed in different orders. Additionally, the acts described herein may be repeated or performed in parallel with one another or in parallel with different instances of the same or similar acts.

FIG. 10 illustrates a series of acts for providing a deficiency notification. The series of acts 1000 includes an act 1002 of identifying a low-results query. In particular, the act 1002 comprises monitoring a plurality of digital queries and digital responses via a website corresponding to a digital item list to identify a low-results query. Additionally, the act 1002 may comprise identifying a low-results query from the plurality of digital queries based on the number of results from the plurality of digital responses corresponding to the plurality of digital queries. In some embodiments, identifying the low-results query comprises determining a number of client devices providing the low-results query and comparing the number of client devices with a client device threshold. Additionally, in some embodiments, identifying the low-results query comprises monitoring digital responses associated with the low-results query provided via the website; determining a number of results corresponding to the digital responses associated with the low-results query; and comparing the number of results corresponding to the digital responses associated with the low-results query to a low-results threshold.

In some embodiments, the act 1002 comprises identifying the low-results query by determining that the number of results corresponding to digital responses associated with the low-results query equals zero. Additionally, in some implementations, identifying the low-results query comprises determining a number of client devices providing the low-results query; and determining that the number of client devices meets a client device threshold. Furthermore, in some embodiments, identifying the low-results query comprises determining that the number of results corresponding to digital responses associated with the low-results query falls below a low-results threshold.

In some implementations, the act 1002 comprises identifying the low-results query by comparing a number of results corresponding to the digital responses associated with the low-results query to a low-results threshold; and comparing a number of client devices providing the low-results query to a client device threshold.

The series of acts 1000 includes an act 1004 of generating a query feature vector and a set of item feature vectors. In particular, the act 1004 comprises generating a query feature vector for the low-results query and a set of item feature vectors from the digital item list. Additionally, the act 1004 may comprise extracting, utilizing an embedding machine learning model, a query feature vector from the low-results query and a set of item feature vectors from the digital item list. In some implementations, generating the set of item feature vectors from the digital item list comprises extracting, utilizing an embedding machine learning model, content embeddings for the digital item list; and expanding the content embeddings for the digital item list by including neighboring embeddings within an embedding feature space.

As illustrated in FIG. 10, the series of acts 1000 includes an act 1006 of generating a deficiency score. In particular, the act 1006 comprises generating, based on the query feature vector and the set of item feature vectors and utilizing a deficiency prediction model, a deficiency confidence score indicating an item deficiency corresponding to the low-results query. The act 1006 may further comprise determining a feature distance between the query feature vector and the set of item feature vectors within an embedding feature space. Additionally, the act 1006 may further comprise generating, utilizing a deficiency prediction model, a deficiency confidence score indicating an item deficiency corresponding to the low-results query and the digital item list.

In some embodiments, as part of the act 1006, generating the deficiency confidence score comprises determining a feature distance between the query feature vector and the set of item feature vectors within an embedding feature space; and generating the deficiency confidence score, utilizing the deficiency prediction model, from the feature distance between the query feature vector and the set of item feature vectors. Additionally, in some embodiments, generating the deficiency confidence score comprises generating, based on the low-results query, a time series feature of the low-results query; and generating the deficiency confidence score, utilizing the deficiency prediction model, from the time series feature. In some implementations, generating the time series feature comprises determining an occurrence of when client devices provide the low-results query; and classifying, utilizing a time series model, the occurrence as at least one of sporadic, peaking, seasonal, or recurrent.

In some embodiments, as part of the act 1006, generating the deficiency confidence score comprises: determining, utilizing an entity matching model, a named entity from the low-results query; and generating the deficiency confidence score, utilizing the deficiency prediction model, from the named entity. In some embodiments, generating the deficiency confidence score comprises determining, utilizing an entity matching model, a named entity from the low-results query, wherein the named entity corresponds to a real-world object; and generating the deficiency confidence score, utilizing the deficiency prediction model, from the named entity.

Additionally, in some embodiments, as part of the act 1006, generating the deficiency confidence score comprises determining a frequency of when client devices provide the low-results query; generating, utilizing a time series model, a time series feature classifying the frequency as at least one of sporadic, peaking, seasonal, or recurrent; and generating the deficiency confidence score, utilizing the deficiency prediction model, from the time series feature.

The series of acts 1000 illustrated in FIG. 10 comprises an act 1008 of providing a deficiency notification. In particular, the act 1008 comprises providing, for display via a graphical user interface at a user client device, a deficiency notification based on the deficiency confidence score corresponding to the low-results query.

The series of acts 1000 may further include an additional act of identifying one or more item sources associated with an item corresponding to the item deficiency; and providing, for display within the deficiency notification, an indication of the one or more item sources. In some embodiments, providing the indication of the one or more item sources comprises determining item source rankings for the one or more item sources associated with the item; and listing the one or more item sources based on the item source rankings.

The series of acts 1000 may also include additional acts comprising receiving an indication of a user selection of the notification; and providing, for display via the graphical user interface, an item deficiency user interface. In some embodiments, the item deficiency user interface comprises a number of client devices providing the low-results query and a frequency of when the client devices provided the low-results query.

In addition (or in the alternative to) the acts described above, in some embodiments, the series of acts 1000 includes a step for determining a deficiency confidence score from the low-results query and the digital item list. For example, the acts described in reference to FIGS. 4-6, 7B can comprise the corresponding acts (or structure) for performing a step for determining a deficiency confidence score.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
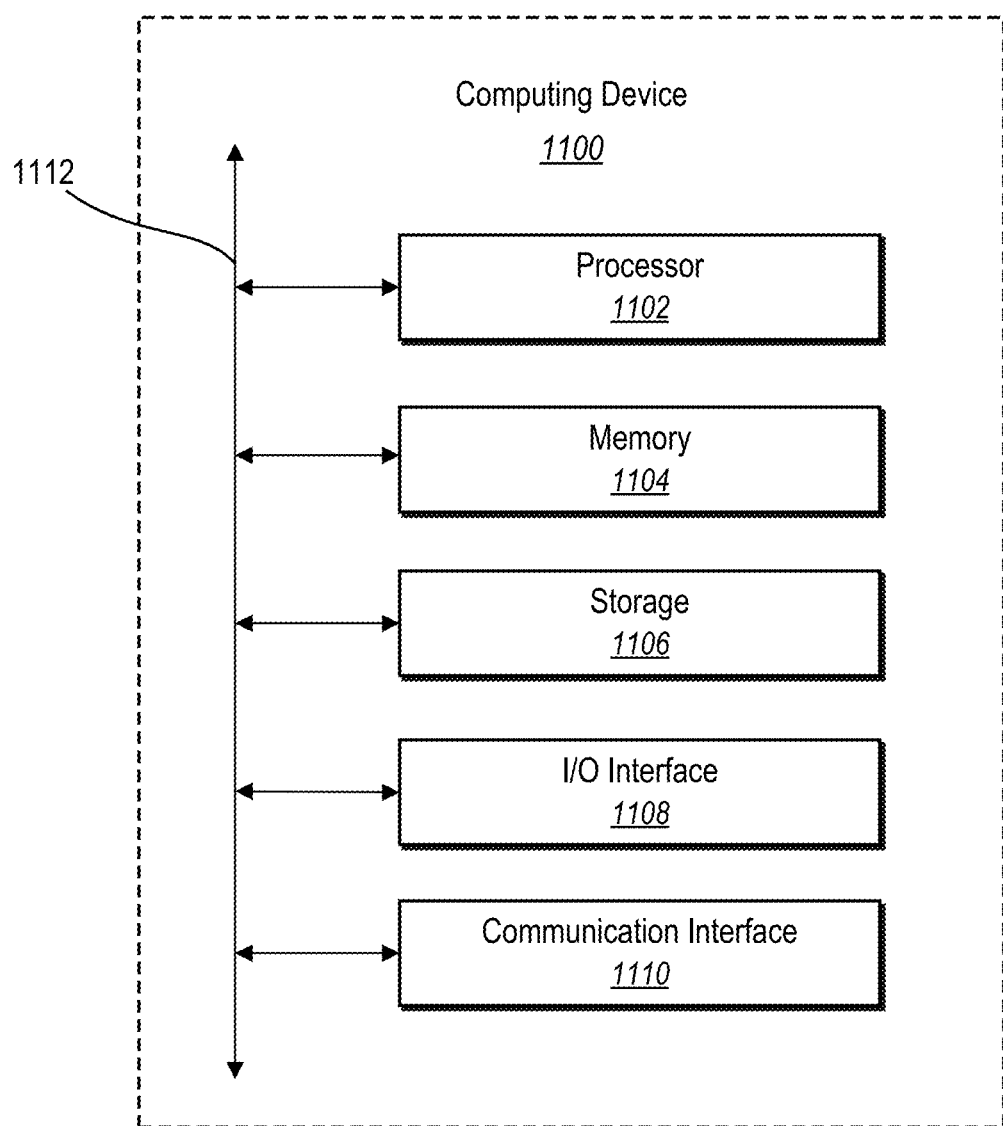
FIG. 11 illustrates a block diagram of an example computing device in accordance with one or more embodiments of the present disclosure.

FIG. 11 illustrates a block diagram of a computing device 1100 that may be configured to perform one or more of the processes described above. One will appreciate that one or more computing devices such as the computing device 1100 may implement the deficiency identification system 106 and the online content management system 104. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the image modification process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to perform operations comprising:

monitoring a plurality of digital queries from a plurality of client devices accessing a website and digital responses from the website corresponding to a digital item database comprising a digital catalog of items to identify a low-results query;

based on identifying the low-results query, determining that the low-results query corresponds to an item deficiency relative to the digital item database by:

generating a low-results query feature vector for the low-results query;

generating, utilizing an embedding machine learning model, a set of item feature vectors from the digital item database;

determining a feature distance between the low-results query feature vector and the set of item feature vectors;

extracting, utilizing an entity matching model, one or more named entities from digital text of the low-results query;

generating a time series feature classification by classifying, utilizing a time series model, the low-results query into the time series feature classification from a plurality of time series feature classifications; and generating, utilizing a deficiency prediction model to analyze the feature distance between the low-results query feature vector and the set of item feature vectors, the one or more named entities, and the time series feature classification by inputting the feature distance, the one or more named entities, and the time series feature classification into the deficiency prediction model, a deficiency confidence score indicating the item deficiency corresponding to the low-results query, wherein the item deficiency indicates that the digital item database is missing an item corresponding to the low-results query;

displaying, via an item deficiency graphical user interface at an administrator client device corresponding to the website, an overview of low-results digital queries from monitoring the plurality of digital queries, indicators representing deficiency confidence scores corresponding to the low-results digital queries, a query specific deficiency notification based on the deficiency confidence score corresponding to the low-results query indicating that the digital item database is missing the item corresponding to the low-results query, and an item source element for the administrator client device to view one or more item sources to obtain the item that is missing corresponding to the low-results query; and in response to receiving a selection of the item source element to view the one or more item sources, displaying, at an item source graphical user interface at the administrator client device, the one or more item sources and an option to modify the digital item database to include the item that is missing based on the item deficiency, wherein the item source graphical user interface is different than the item deficiency graphical user interface.

2. The non-transitory computer readable medium of claim 1, wherein determining the feature distance between the low-results query feature vector and the set of item feature vectors comprises:
   extracting the set of item feature vectors by using the embedding machine learning model to extract embeddings for core content of the digital item database;
   extracting the low-results query feature vector by using the embedding machine learning model to extract embeddings that represent content of the low-results query; and
   generating the deficiency confidence score, utilizing the deficiency prediction model, from the feature distance between the low-results query feature vector and the set of item feature vectors, wherein the deficiency confidence score indicates that based on the feature distance, the digital item database is missing the item corresponding to the low-results query.

3. The non-transitory computer readable medium of claim 1, wherein generating the deficiency confidence score comprises:
   generating, based on the low-results query, the time series feature classification of the low-results query by comparing occurrences of when the plurality of client devices provide the low-results query to parameters of a time series representation; and
   generating the deficiency confidence score, utilizing the deficiency prediction model, from the time series feature classification, wherein the deficiency confidence score indicates that based on the time series feature classification, the digital item database is missing the item corresponding to the low-results query.

4. The non-transitory computer readable medium of claim 3, wherein generating the time series feature classification comprises:
   determining an occurrence of when the plurality of client devices provide queries that are the low-results query; and
   classifying, utilizing the time series model, the occurrence as at least one of sporadic, peaking, seasonal, or recurrent.

5. The non-transitory computer readable medium of claim 1, wherein extracting the one or more named entities comprises:
   determining, utilizing the entity matching model, that the digital text of the low-results query indicates a real-world object denoted through a proper noun comprising persons, places, or things;
   classifying the one or more named entities that indicates the real-world object as at least one of an organization, a product, a person name, a geopolitical entity, a location, a facility, an event, a work of art, a law, or a language; and
   in response to inputting the one or more named entities into the deficiency prediction model, generating the deficiency confidence score, wherein the deficiency confidence score indicates that based on the one or more named entities indicating the real-world object, the digital item database is missing the item corresponding to the low-results query.

6. The non-transitory computer readable medium of claim 1, wherein identifying the low-results query comprises:
   determining a number of client devices providing the low-results query; and
   comparing the number of client devices with a client device threshold.

7. The non-transitory computer readable medium of claim 1, wherein identifying the low-results query comprises:
   monitoring digital responses associated with the low-results query provided via the website;
   determining a number of results corresponding to the digital responses associated with the low-results query; and
   comparing the number of results corresponding to the digital responses associated with the low-results query to a low-results threshold.

8. The non-transitory computer readable medium of claim 1, further comprising training the deficiency prediction model in a supervised manner by:
   utilizing the deficiency prediction model to process extracted training features for a low-results training query;
   generating, from the extracted training features, a predicted deficiency confidence score;
   comparing the predicted deficiency confidence score with a training dataset comprising known ground truth deficiency classifications; and
   modifying parameters of the deficiency prediction model based on comparing the predicted deficiency confidence score with the training dataset.

9. The non-transitory computer readable medium of claim 1, further comprising instructions that, when executed by the at least one processor, cause the computing device to perform operations comprising:
   displaying at a query overview graphical user interface of the administrator client device, an expanded deficiency notification of the low-results query;
   receiving a selection of a report element of the expanded deficiency notification; and
   causing the query overview graphical user interface of the administrator client device to transition to the item deficiency graphical user interface.

10. The non-transitory computer readable medium of claim 1, wherein providing the one or more item sources and the option to modify the digital item database comprises:
    determining item source rankings for the one or more item sources associated with the item; and
    listing the one or more item sources based on the item source rankings.

11. A system comprising:
    a non-transitory computer-readable medium comprising:
       a plurality of digital queries for a website, a plurality of digital responses corresponding to the plurality of digital queries comprising a number of results, and a digital item database comprising a digital catalog of items stored on a repository of the website; and
    at least one processor configured to cause the system to:
       identify a low-results query from the plurality of digital queries based on the number of results from the plurality of digital responses corresponding to the plurality of digital queries;
       based on identifying the low-results query, determining whether the low-results query corresponds to an item deficiency relative to the digital item database by:
          extracting, utilizing an embedding machine learning model, a low-results query feature vector from the low-results query;
          generating, utilizing the embedding machine learning model, a set of item feature vectors from the digital item database;

determining a feature distance between the low-results query feature vector and the set of item feature vectors within an embedding feature space;

extracting, utilizing an entity matching model, one or more named entities from digital text of the low-results query;

generating a time series feature classification by classifying, utilizing a time series model, the low-results query into the time series feature classification from a plurality of time series feature classifications; and generating, utilizing a deficiency prediction model to analyze the feature distance between the low-results query feature vector and the set of item feature vectors, the one or more named entities, and the time series feature classification by inputting the feature distance, the one or more named entities, and the time series feature classification into the deficiency prediction model, a deficiency confidence score indicating an item deficiency corresponding to the low-results query and the digital item database, wherein the item deficiency indicates that the digital item database is missing an item corresponding to the low-results query;

displaying, via an item deficiency graphical user interface at an administrator client device corresponding to the website, an overview of low-results digital queries from monitoring the plurality of digital queries, indicators representing deficiency confidence scores corresponding to the low-results digital queries, a query specific deficiency notification based on the deficiency confidence score corresponding to the low-results query indicating that the digital item database is missing the item corresponding to the low-results query, and an item source element for the administrator client device to view one or more item sources to obtain the item that is missing corresponding to the low-results query; and in response to receiving a selection of the item source element to view the one or more item sources, displaying at an item source graphical user interface at the administrator client device, the one or more item sources and an option to modify the digital item database to include the item that is missing based on the item deficiency, wherein the item source graphical user interface is different than the item deficiency graphical user interface.

12. The system of claim 11, wherein the at least one processor is further configured to cause the system to generate the deficiency confidence score by:

determining a frequency of when client devices provide the low-results query;

generating, utilizing the time series model, the time series feature classification of the low-results query, wherein the time series feature classification represents at least one of sporadic, peaking, seasonal, or recurrent; and generating the deficiency confidence score, utilizing the deficiency prediction model, from the time series feature classification, wherein the deficiency confidence score indicates that the digital item database is missing the item corresponding to the low-results query.

13. The system of claim 11, wherein the at least one processor is further configured to cause the system to train the deficiency prediction model in a supervised manner by:

utilizing the deficiency prediction model to process extracted training features for a low-results training query;

generating, from the extracted training features, a predicted deficiency confidence score;

comparing the predicted deficiency confidence score with user input that confirms or undermines an existence of an item deficiency for the low-results training query; and modifying parameters of the deficiency prediction model based on comparing the predicted deficiency confidence score with the user input.

14. The system of claim 11, wherein the at least one processor is further configured to cause the system to generate the deficiency confidence score by:

determining, utilizing the entity matching model, that the digital text of the low-results query indicates a real-world object denoted through a proper noun comprising persons, places, or things;

classifying the one or more named entities that indicates the real-world object as at least one of an organization, a product, a person name, a geopolitical entity, a location, a facility, an event, a work of art, a law, or a language; and in response to inputting the one or more named entities into the deficiency prediction model, generating the deficiency confidence score, wherein the deficiency confidence score indicates that based on the one or more named entities indicating the real-world object, the digital item database is missing the item corresponding to the low-results query.

15. The system of claim 11, wherein the at least one processor is further configured to cause the system to identify the low-results query by:

determining a number of client devices providing the low-results query; and determining that the number of client devices satisfies a client device threshold.

16. The system of claim 11, wherein the at least one processor is further configured to cause the system to identify the low-results query by determining that the number of results corresponding to digital responses associated with the low-results query satisfies a low-results threshold.

17. A computer-implemented method comprising:

monitoring a plurality of digital queries and digital responses from a website corresponding to a digital item database to identify a low-results query;

based on identifying the low-results query, determining that the low-results query corresponds to an item deficiency relative to the digital item database by:

generating a low-results query feature vector for the low-results query;

generating, utilizing, an embedding machine learning model, a set of item feature vectors from the digital item database;

determining a feature distance between the low-results query feature vector and the set of item feature vectors;

extracting, utilizing an entity matching model, one or more named entities from digital text of the low-results query;

generating a time series feature classification by classifying, utilizing a time series model, the low-results query into the time series feature classification from a plurality of time series feature classifications;

generating, utilizing a deficiency prediction model to analyze the feature distance between the low-results query feature vector and the set of item feature vectors, the one or more named entities, and the time series feature classification by inputting the feature distance, the one or more named entities, and the time series feature classification into the deficiency prediction model, a deficiency confidence score corresponding to the low-results query; and comparing the deficiency confidence score to a threshold deficiency confidence score, the deficiency confidence score indicating that the digital item database is missing an item corresponding to the low-results query;

displaying, via an item deficiency graphical user interface at an administrator client device corresponding to the website, an overview of low-results digital queries from monitoring the plurality of digital queries, indicators representing deficiency confidence scores corresponding to the low-results digital queries, a query specific notification indicating a deficiency corresponding to the low-results query indicating that the digital item database is missing the item corresponding to the low-results query, and an item source element for the administrator client device to view one or more item sources to obtain the item that is missing corresponding to the low-results query; and in response to receiving a selection of the item source element to view the one or more item sources, displaying at an item source graphical user interface at the administrator client device, the one or more item sources and an option to modify the digital item database to include the item that is missing based on the item deficiency, wherein the item source graphical user interface is different than the item deficiency graphical user interface.

18. The computer-implemented method of claim 17, further comprising identifying the low-results query by:
comparing a number of results corresponding to the digital responses associated with the low-results query to a low-results threshold; and
comparing a number of client devices providing the low-results query to a client device threshold.

19. The computer-implemented method of claim 17, further comprising:
displaying at a query overview graphical user interface of the administrator client device, an expanded deficiency notification of the low-results query;
receiving a selection of a report element of the expanded deficiency notification; and
causing the query overview graphical user interface of the administrator client device to transition to the item deficiency graphical user interface.

20. The computer-implemented method of claim 17, wherein the item deficiency graphical user interface comprises a number of client devices providing the low-results query and a frequency of the client devices providing the low-results query.

* * * * *